(12) United States Patent
West et al.

(10) Patent No.: US 9,231,875 B1
(45) Date of Patent: Jan. 5, 2016

(54) METHOD OF PROCESSING TRAFFIC IN A TRANSPORT NETWORK

(71) Applicant: Cyan, Inc., Petaluma, CA (US)

(72) Inventors: Stephen J. West, Petaluma, CA (US); Scott Pradels, Santa Rosa, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/473,973

(22) Filed: Aug. 29, 2014

Related U.S. Application Data

(60) Continuation of application No. 13/405,330, filed on Feb. 26, 2012, now Pat. No. 8,849,111, which is a division of application No. 12/148,281, filed on Apr. 16, 2008, now Pat. No. 8,155,520.

(51) Int. Cl.
*H04B 10/00* (2013.01)
*H04L 12/801* (2013.01)
*H04Q 11/00* (2006.01)
*H04L 12/721* (2013.01)

(52) U.S. Cl.
CPC .............. *H04L 47/193* (2013.01); *H04L 45/66* (2013.01); *H04Q 11/0066* (2013.01); *H04Q 2011/0073* (2013.01); *H04Q 2011/0086* (2013.01)

(58) Field of Classification Search
USPC ..................................................... 398/45–57
See application file for complete search history.

(56) References Cited

U.S. PATENT DOCUMENTS

| | | | |
|---|---|---|---|
| 3,681,665 A | 8/1972 | Olds et al. | |
| 5,247,427 A | 9/1993 | Driscoll et al. | |
| 5,594,576 A * | 1/1997 | Sutherland | H04Q 11/0067 398/164 |
| 5,940,266 A | 8/1999 | Hamilton et al. | |
| 6,000,464 A | 12/1999 | Scafidi et al. | |
| 6,494,593 B2 | 12/2002 | An et al. | |
| 6,606,427 B1 * | 8/2003 | Graves | G02B 6/3849 385/17 |
| 6,668,106 B1 * | 12/2003 | Levine | H04Q 11/0005 333/113 |
| 6,760,339 B1 * | 7/2004 | Noel | G06F 1/14 361/788 |
| 6,816,590 B2 * | 11/2004 | Pike | H04M 3/005 361/695 |
| 6,861,943 B2 * | 3/2005 | Pike | G06F 1/20 340/3.9 |
| 6,931,211 B2 * | 8/2005 | English | H04B 10/801 385/14 |
| 6,947,623 B2 * | 9/2005 | Ramaswami | H04Q 11/0005 385/15 |
| 7,013,084 B2 * | 3/2006 | Battou | G06F 8/65 398/45 |
| 7,079,381 B2 * | 7/2006 | Brehm | H05K 7/1454 361/679.33 |
| 7,079,485 B1 * | 7/2006 | Lau | H04L 49/3045 370/229 |
| 7,099,271 B2 * | 8/2006 | Friesen | H04L 12/2602 370/218 |

(Continued)

OTHER PUBLICATIONS

ITU-T Recommendation G.975—Forward Error Correction for Submarine Systems, Oct. 2000, pp. 22.

(Continued)

*Primary Examiner* — Agustin Bello
(74) *Attorney, Agent, or Firm* — Omkar K. Suryadevara; Silicon Valley Patent Group LLP

(57) ABSTRACT

A network element of a transport network has three fabrics housed within a single shelf of a telco rack, namely a packet fabric, an electrical fabric and an optical fabric. A stream of traffic including a plurality of lambdas is received at a trunk interface of such a shelf. The optical fabric in the shelf performs optical switching on the stream to replace a first lambda in the stream with a second lambda. The first lambda is converted within the shelf into an electrical signal. Also within the shelf, first frames are recovered from the electrical signal. The packet fabric in the shelf is used to perform packet switching on the first frames to generate a flow of second frames. The flow of second frames is transmitted at a client interface of the shelf.

20 Claims, 28 Drawing Sheets

(56) References Cited

U.S. PATENT DOCUMENTS

| | | | | |
|---|---|---|---|---|
| 7,127,171 | B2* | 10/2006 | Martin | H04Q 11/0478 398/50 |
| 7,209,477 | B2* | 4/2007 | Pike | H04L 49/351 370/360 |
| 7,215,552 | B2 | 5/2007 | Shipley et al. | |
| 7,218,640 | B2* | 5/2007 | Lebizay | H04L 47/12 370/413 |
| 7,242,867 | B1* | 7/2007 | Clouinard | H04J 3/0685 398/45 |
| 7,251,256 | B1* | 7/2007 | Barry | H04J 3/0658 370/503 |
| 7,263,290 | B2* | 8/2007 | Fortin | H04J 14/0278 398/58 |
| 7,272,309 | B1* | 9/2007 | Tamil | H04L 45/62 370/351 |
| 7,280,356 | B2 | 10/2007 | Pfahnl et al. | |
| 7,289,436 | B2* | 10/2007 | Schaller | H04L 41/0631 370/225 |
| 7,417,950 | B2* | 8/2008 | Hofmeister | H04L 12/4633 370/230 |
| 7,460,482 | B2* | 12/2008 | Pike | H04L 29/06 370/241 |
| 7,466,924 | B2* | 12/2008 | English | H04B 10/801 385/14 |
| 7,539,184 | B2* | 5/2009 | Campini | H04L 12/24 370/388 |
| 7,593,225 | B2 | 9/2009 | Sasagawa et al. | |
| 7,619,886 | B2* | 11/2009 | Soetemans | H05K 7/1459 361/694 |
| 7,644,215 | B2* | 1/2010 | Wallace | G06F 13/385 710/300 |
| 7,653,052 | B2* | 1/2010 | Pike | H04Q 11/0421 370/360 |
| 7,693,976 | B2* | 4/2010 | Perry | H04L 7/0008 340/1.1 |
| 7,707,304 | B1* | 4/2010 | Lolayekar | H04L 47/10 709/232 |
| 7,710,866 | B2* | 5/2010 | Soetemans | H04L 45/02 370/218 |
| 7,722,359 | B1 | 5/2010 | Frangioso, Jr. et al. | |
| 7,796,501 | B2* | 9/2010 | Oltman | H04L 49/40 370/216 |
| 7,801,120 | B2* | 9/2010 | Steinmetz | G06F 3/0613 370/360 |
| 7,818,387 | B1* | 10/2010 | King | G06F 11/0766 709/208 |
| 7,821,790 | B2* | 10/2010 | Sharma | H05K 7/1424 361/725 |
| 7,852,781 | B1* | 12/2010 | Felton | H04L 41/0823 326/27 |
| 7,918,599 | B2 | 4/2011 | Chang | |
| 8,390,993 | B1* | 3/2013 | Wilson | G02B 6/43 340/815.45 |
| 2002/0176131 | A1* | 11/2002 | Walters | G06F 8/65 398/58 |
| 2003/0033409 | A1* | 2/2003 | King | G06F 1/183 709/225 |
| 2003/0081624 | A1* | 5/2003 | Aggarwal | H04L 12/5601 370/412 |
| 2003/0101426 | A1* | 5/2003 | Sarkinen | H04L 45/60 716/126 |
| 2003/0210870 | A1* | 11/2003 | Graves | H04Q 11/0005 385/71 |
| 2004/0264128 | A1 | 12/2004 | Crippen et al. | |
| 2005/0207134 | A1 | 9/2005 | Belady et al. | |
| 2006/0067049 | A1 | 3/2006 | Horiguchi et al. | |
| 2006/0248761 | A1 | 11/2006 | Cheung et al. | |
| 2006/0279946 | A1 | 12/2006 | Park et al. | |
| 2007/0004468 | A1 | 1/2007 | Boros | |
| 2007/0293137 | A1 | 12/2007 | Crippen et al. | |
| 2008/0158906 | A1 | 7/2008 | Park et al. | |
| 2008/0160899 | A1 | 7/2008 | Henry et al. | |
| 2008/0180903 | A1 | 7/2008 | Bisson et al. | |
| 2009/0002938 | A1 | 1/2009 | Stewart et al. | |
| 2009/0154098 | A1 | 6/2009 | Nguyen | |
| 2009/0257751 | A1* | 10/2009 | Sadananda | H04J 14/0227 398/83 |
| 2010/0064169 | A1* | 3/2010 | Davies | G06F 11/1456 714/6.12 |
| 2010/0166422 | A1* | 7/2010 | Shanbhag | H04L 49/356 398/45 |
| 2011/0069954 | A1* | 3/2011 | Hu | H04Q 11/0067 398/45 |

OTHER PUBLICATIONS

ITU-T Recommendation G.975.1—Forward Error Correction for high bit-rate DWDM submarine systems, Feb. 2004, pp. 57.

IEEE 802.1ah/D4.0—Draft Amendment to IEEE Std 802.Q—REV, Virtual Bridged Local Area Networks—Amendment 6: Provider Backbone Bridges, Nov. 21, 2007, pp. 108.

IEEE 802.1Qay/D2.0—Draft Amendment to IEEE Std 802.Q—2005, Virtual Bridged Local Area Networks—Amendment: Provider Backbone Bridge Traffic Engineering, Feb. 15, 2008, pp. 115.

Dune Networks FAP21V/FAP11V Fully Programmable Metro Ethernet and Access Traffic Manager Devices, believed to be published prior to Apr. 2008, downloaded from http://www.en-genius.net/site/zones/networkZONE/product_reviews/net, pp. 4.

Dune Networks Fabric Access Processor FAP11/21V, believed to be published prior to Apr. 2008, downloaded from http://extranet.dunenetworks.com/multimedia/upl_doc/FAP11-21V-low-resolution.pdf, pp. 3.

Xelerated Extends Leadership in High-Performance Network Processing With Introduction of two new Products, believed to be published prior to Apr. 2008, downloaded from http://www.thefreelibrary.com/_/print/PrintArticle.aspx?id=174008190, pp. 3.

Response to Amendment under Rule 312 dated Mar. 7, 2012 in U.S. Appl. No. 12/148,281, pp. 2.

U.S. App. No. 12/210,204, filed Sep. 14, 2008, by Colin J. Wilson et al., 54 pages.

Office Action dated Sep. 20, 2011 in U.S. Appl. No. 12/210,204, 7 pages.

Amendment dated Dec. 20, 2011 in U.S. Appl. No. 12/210,204, 8 pages.

Notice of Informality dated Jan. 9, 2012 in U.S. Appl. No. 12/210,204, 2 pages.

Response to Notice of Informality dated Jan. 10, 2012 in U.S. Appl. No. 12/210,204, 6 pages.

Final Office Action dated Mar. 13, 2012 in U.S. Appl. No. 12/210,204, 8 pages.

Amendment filed with RCE dated Jul. 13, 2012 in U.S. Appl. No. 12/210,204, 8 pages.

Request for Continued Examination dated Nov. 4, 2011 in U.S. Appl. No. 12/148,281, 6 pages.

U.S. Appl. No. 13/405,330, filed Feb. 26, 2012, by Steven J. West et al., 90 pages.

Supplemental Response dated Feb. 27, 2013 in U.S. Appl. No. 13/405,330, 1 page.

Office Action dated Jun. 19, 2013 in U.S. Appl. No. 13/405,330, 6 pages.

Response dated Jul. 19, 2013 in U.S. Appl. No. 13/405,330, 15 pages.

Office Action dated Aug. 15, 2013 in U.S. Appl. No. 13/405,330, 9 pages.

Response dated Nov. 15, 2013 in U.S. Appl. No. 13/405,330, 15 pages.

Notice of Allowance dated Feb. 7, 2014 in U.S. Appl. No. 13/405,330, 5 pages.

Amendment dated May 5, 2014 in U.S. Appl. No. 13/405,330, 12 pages.

Notice of Allowance dated May 23, 2014 in U.S. Appl. No. 13/405,330, 5 pages.

Office Action dated Dec. 16, 2010 in U.S. Appl. No. 12/210,211, pp. 9.

Amendment dated Mar. 16, 2011 in U.S. Appl. No. 12/210,211, pp. 22.

Notice of Allowance dated Apr. 1, 2011 in U.S. Appl. No. 12/210,211, pp. 9

Amendment dated Jul. 1, 2011 in U.S. Appl. No. 12/210,211, pp. 10.

(56) References Cited

OTHER PUBLICATIONS

Notice of Allowance dated Jul. 18, 2011 in U.S. Appl. No. 12/210,211, pp. 12.
Office Action dated Feb. 8, 2011 in U.S. Appl. No. 12/148,281, pp. 6.
Response dated Mar. 8, 2011 in U.S. Appl. No. 12/148,281, p. 1.
Office Action dated Apr. 1, 2011 in U.S. Appl. No. 12/148,281, pp. 13.
Amendment dated Jul. 1, 2011 in U.S. Appl. No. 12/148,281, pp. 7.
Notice of Allowance dated Aug. 4, 2011 in U.S. Appl. No. 12/148,281, pp. 5.
Notice of Allowance dated Nov. 23, 2011 in U.S. Appl. No. 12/148,281, pp. 8.
Amendment after Notice of Allowance dated Feb. 23, 2012 in U.S. Appl. No. 12/148,281, pp. 8.
Advanced TCA, PICMG 3.0 Short Form Specification, Jan. 2003, pp. 34.
PICMG® 3—Frequently Asked Questions, compiled by PICMG President Joe Pavlat, believed to be prior to Sep. 14, 2008, pp. 7.
U.S. Appl. No. 12/148,281 by Stephen J. West et al. filed Apr. 16, 2008, pp. 65.
U.S. Appl. No. 12/210,211 by Stephen J. West et al. filed Sep. 14, 2008, pp. 46.
U.S. Appl. No. 13/292,816 by Stephen J. West et al. filed Nov. 9, 2011, pp. 47.
ITU-T Recommendation G.709/Y.1331—Interfaces for the Optical Transport Network (OTN), Mar. 2003, pp. 118.

\* cited by examiner

Key To

METHOD OF PROCESSING TRAFFIC IN A TRANSPORT NETWORK

CROSS REFERENCE TO PARENT APPLICATION

This application is a continuation application of U.S. application Ser. No. 13/405,330 filed on Feb. 26, 2012 by Stephen J. West and Scott Pradels, and entitled "Method of Processing Traffic In A Transport Network" that in turn is a divisional application of U.S. application Ser. No. 12/148,281 filed on Apr. 16, 2008 by Stephen J. West and Scott Pradels, issued as U.S. Pat. No. 8,155,520 and entitled "MULTI-FABRIC SHELF FOR A TRANSPORT NETWORK". U.S. application Ser. No. 13/405,330 and U.S. Pat. No. 8,155,520 are both incorporated by reference herein in their entireties.

RE-VISIT NOTICE

Applicant hereby rescinds any disclaimer of claim scope in the above-identified parent application (namely U.S. application Ser. No. 13/405,330) or grandparent application (namely U.S. application Ser. No. 12/148,281) or the corresponding prosecution histories thereof and advises the US Patent and Trademark Office (USPTO) that the claims in the current application may be broader than any claim in the parent application or the grandparent application. Applicant notifies the USPTO of a need to re-visit the disclaimer of claim scope in the parent application and grandparent application, and to further re-visit all prior art cited in the parent application and grandparent application, including but not limited to cited references over which any disclaimer of claim scope was made in the parent application or grandparent application or the corresponding prosecution histories thereof. See *Hakim v. Cannon Avent Group, PLC,* 479 F.3d 1313 (Fed. Cir. 2007). Moreover, any disclaimer made in the current application should not be read into or against the parent application.

BACKGROUND

A transport network is typically composed of nodes at various locations that are interconnected by optical fibers, to transport traffic over long distances (such as distances between cities). The traffic includes discrete units of data e.g. conforming to Internet Protocol (IP), as well as time-sensitive streams of data as in voice circuits in traditional telephony. Each node in the transport network typically provides one or more functions for creating signals which are transmitted on the optical fibers.

FIG. 1 illustrates a prior art network which implemented using routers to process IP packets, using multiservice provisioning platforms (MSSPs) to generate optical signals, and using optical add drop multiplexers to transport the optical signals across the transport network. In the architecture illustrated in FIG. 1, a flow of packets from node A to node Z is typically processed at each intermediate node, I, J and K. An optical signal generated by node A may contain not only packets for node Z but also packets for intermediate nodes I, J and K. In addition to packet traffic, an optical signal from node A to node I may also contain time-divison-mulitplexed (TDM) traffic, such as SONET.

The inventors of the current patent application note several drawbacks in using a combination of routers, MSSPs that lack an optical backplane, and OADMs as shown in FIG. 1. Specifically, the current inventors believe that router-based transport is expensive, consumes precious resources, and compromises network performance due to higher latency. Moreover, the current inventors believe that MSSPs being based on SONET/SDH circuit-based hierarchy are obsolete because packet traffic over transport networks is increasing significantly relative to traditional telephony voice traffic. For example, increase in packet traffic is caused by residential users demand for packet-based applications, such as transport of video over the Internet. As another example, increase in packet traffic is caused by business users expanding enterprise-wide Ethernet based networks to reach across the Internet. Accordingly, the inventors of the current patent application believe there is a need for improvement in network elements of a transport network.

SUMMARY

In accordance with the invention, a network element of a transport network has three fabrics housed within a single shelf of a telco rack, namely a packet fabric, an electrical fabric and an optical fabric. A stream of traffic which includes a plurality of lambdas is received at a trunk interface of such a shelf. The optical fabric in the shelf performs optical switching on the stream to replace a first lambda in the stream with a second lambda. The first lambda is converted, within the shelf, into an electrical signal. Also within the shelf, first frames are recovered from the electrical signal. The packet fabric in the shelf is used to perform packet switching on the first frames to generate a flow of second frames. The flow of second frames is transmitted at a client interface of the shelf. The shelf of some embodiments includes inter-fabric circuitry, to bridge between the fabrics. The inter-fabric circuitries switchably transmit packets across fabrics in intermediate nodes of the transport network.

In several embodiments of the invention, circuitry in such a shelf adds new headers to packets for transmission across the transport network in a connection oriented manner. An example of the new header (called backbone header) is a media access control (MAC) header which is newly added to a frame that already has a MAC header, to perform MAC-in-MAC encapsulation for use within the transport network. At the destination node, the added header is removed before supplying packets to an end user or other client.

In some embodiments of the invention, circuitry in the shelf aggregates the information in multiple electrical signals from an electrical fabric in the shelf, and thereafter frames the aggregated signal with error correcting code(s), followed by its conversion into a lambda. The error correction scheme is predetermined, to add redundant information sufficient to overcome attenuation due to a lambda traversing OADM(s) without regeneration.

Presence of three different types of fabrics in a single shelf in accordance with the invention enables optimization across fabrics at an unprecedented level, e.g. optimizing usage of a lambda at the level of packets. Hence, the optical fabric and its external interfaces are used in certain embodiments as an all-optical cross-connect to perform lambda switching within the shelf at an intermediate node (also called OOO switching). At another intermediate node if the signal to noise ratio of a lambda has degraded, the optical fabric and the electrical fabric are used together in the single shelf of that intermediate node, to perform OEO switching and/or regeneration. By use of OOO and/or OEO switching, packet traffic can be sent from a source node to a destination node without recovery of individual packets at intermediate nodes. Elimination of individual packet retrieval and processing at intermediate nodes reduces cost, resource usage, and latency, when compared to use of routers, MSSPs and OADMs. Optimization in packet processing, by its elimination from one or more intermediate nodes, is believed to be nowhere disclosed or rendered obvious by any prior art known to the inventor(s) of the current patent application.

BRIEF DESCRIPTION OF THE FIGURES

FIG. 6I is an exploded view of the shelf of FIGS. 6A-6G, wherein top and side portions of the shelf are removed to improve clarity.

DETAILED DESCRIPTION

In accordance with the invention, a network element of a transport network has a single shelf that holds as many fabrics (e.g. N fabrics) as the number of switching modes (e.g. N switching modes) used to multiplex traffic on a link between nodes in the transport network. The network element has one or more external interfaces to receive/transmit traffic to/from the shelf. The external interfaces can be of at least two types: trunk interfaces and service interfaces. The shelf also contains inter-fabric circuitry that bridges traffic between fabrics. External interfaces and inter-fabric circuitry of the network element exchange traffic between each other through the multiple fabrics in the shelf, based on provisioning by an external network controller.

One illustrative embodiment of the invention uses three multiplexing technologies on links between nodes, namely (a) multiplexing of discrete units of data (called packets) to form an electrical signal to be transmitted across the transport network (packet multiplexing into flows), (b) multiplexing of packet-carrying electrical signals with TDM-carrying electrical signals to form an aggregate (e.g. an ODU2 frame) to be transmitted on a lambda (sub-lambda electrical multiplexing), and (c) dense wave division multiplexing (DWDM) of lambdas within an optical fiber. In this illustrative embodiment, a single shelf 100 (FIG. 3A) houses three types of fabrics: (a) a packet fabric 102 (such as a switch fabric) (b) an electrical fabric 104 (such as an analog electrical crossbar) and (c) an optical fabric 106 (or optical crossbar, such as a passive optical mesh with wavelength selective switch endpoints).

Figure 1:
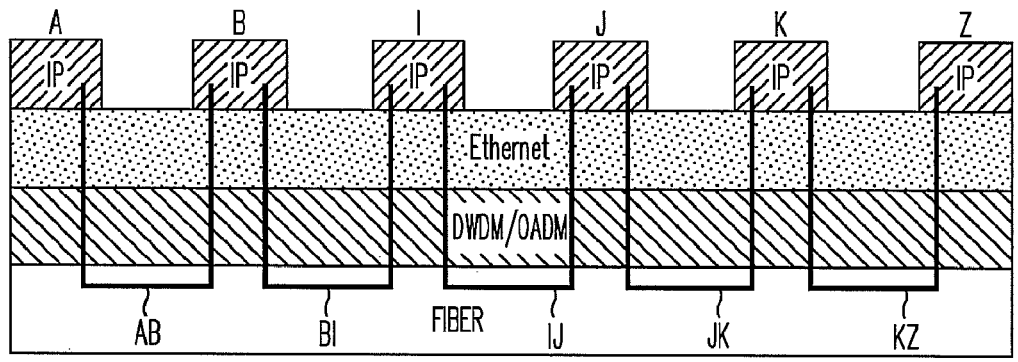
FIG. 1 illustrates, in a block diagram, an architecture of a transport network based on routers, MSSPs and OADMs in the prior art.
Figure 2A:
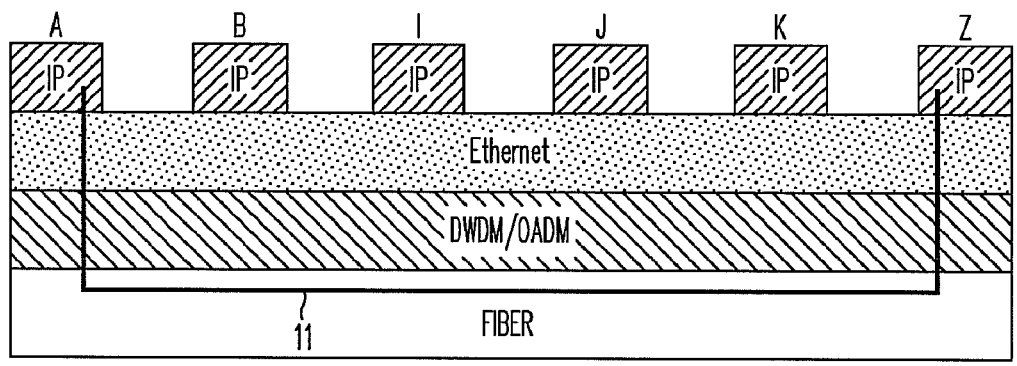
FIG. 2A illustrates, in a block diagram, an architecture of a transport network in accordance with the invention that transfers packets directly on a lambda from a source node A to a destination node Z without packet processing at intermediate nodes.
Figure 2B:
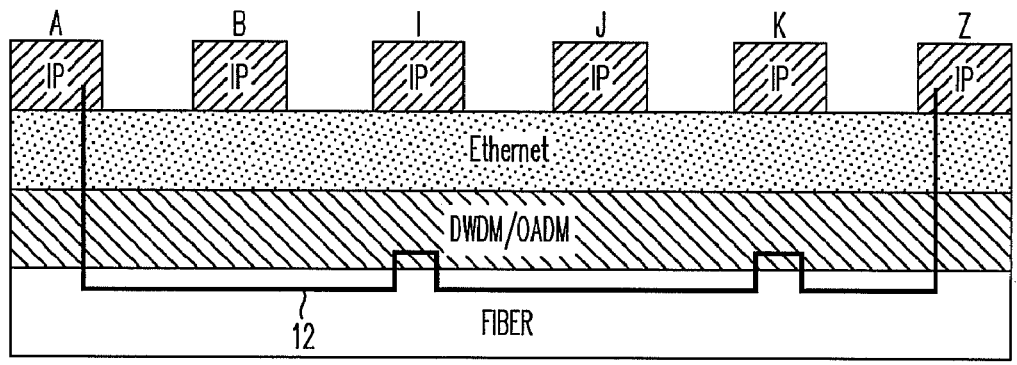
FIG. 2B illustrates, in a block diagram, the architecture of FIG. 2A wherein a lambda carrying packets from a source node A is terminated and regenerated at intermediate nodes I and K before reaching destination node Z, again without packet processing at the intermediate nodes.
Figure 3A:
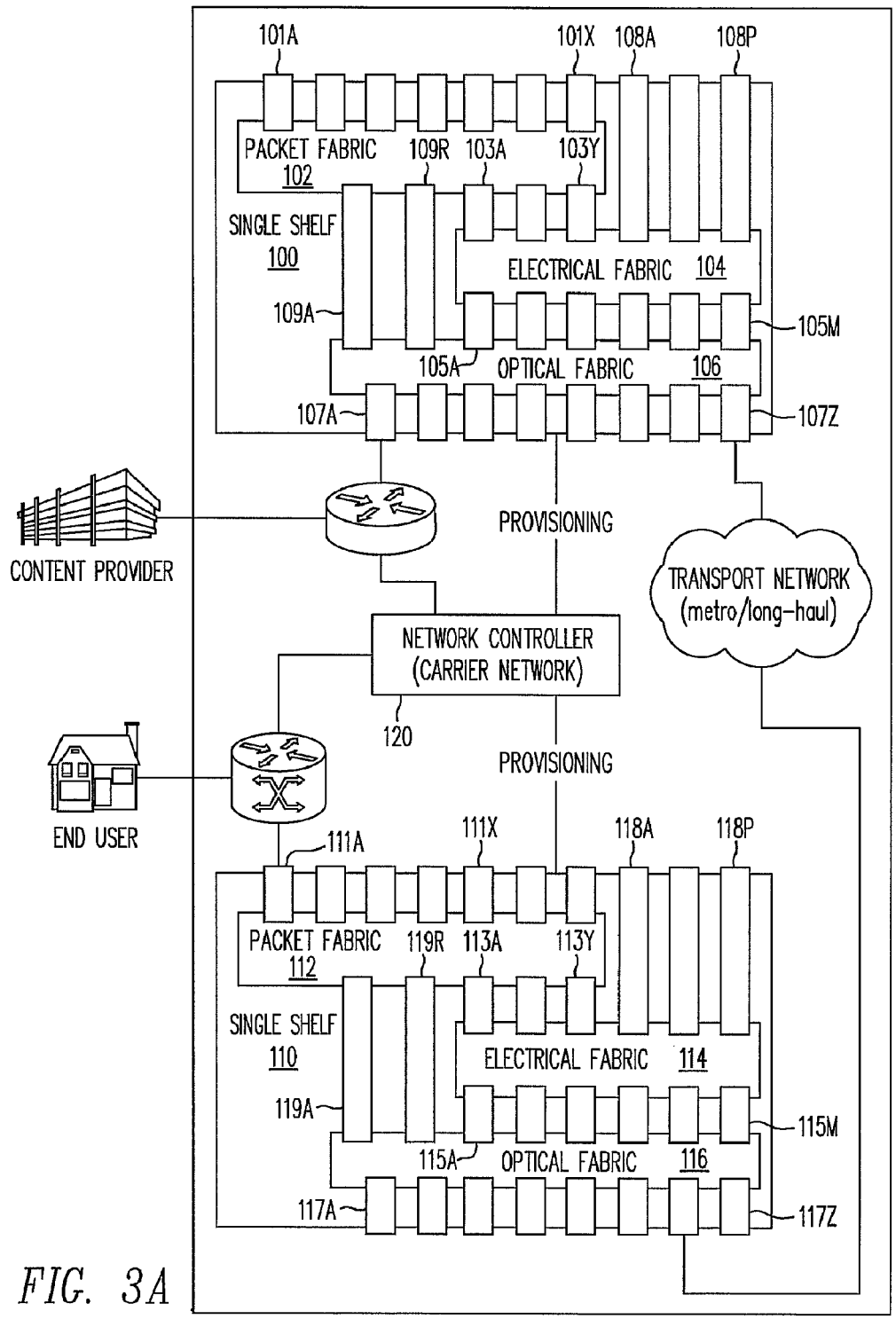
FIG. 3A illustrates, in a block diagram, a single shelf 100 that uses three fabrics to transfer packets directly to another single shelf 110, to implement the architecture shown in FIG. 2A.

In the illustrative embodiment, optical fabric 106 in shelf 100 is implemented as a crossbar in the optical domain that switches optical signals. Such an optical fabric may be used to perform optical switching, on a stream of traffic (comprising a plurality of lambdas) received from a trunk interface, to replace a first lambda in the plurality of lambdas with a second lambda. An example of such an optical crossbar is a passive optical mesh that optically connects all optical interfaces and electrical-optical inter-fabric circuitry to one another as illustrated in FIG. 5E, by use of optical fibers that are laminated. In one illustrative embodiment of the type illustrated in FIG. 5E, each of the 24 end-points includes a fiber that provides an optical connection to each of the other end-points. Referring to FIG. 3A, optical fabric 106 optically connects electrical-optical inter-fabric circuitry 105A-105M, external interfaces 107A-107Z (connected to fibers external to shelf 100), and optionally packet-optical inter-fabric circuitry 109A-109R (if implemented). The passive optical mesh can be used in an optical fabric module 215 in some embodiments, as illustrated inn FIGS. 5F-5I. The optical fibers of one illustrative embodiment are SMF-28, single mode, with maximum insertion loss @1550 nm per connector per channel being 1 dB, and maximum return loss @1550 nm per connector per channel being −50 dB. FIG. 5G illustrates in detail, the front view of slot 3 in shelf 100, which is typical for the remaining slots. Note that slots 10, 12, 14 and 16 in FIG. 5F are not used in the illustrative embodiment. Also note that in the illustrative embodiment, the fibers are laminated to form a flexplane which is installed in an enclosure with fiber facing down. Also mounted in the enclosure are connectors of the type shown in FIG. 5G.

Each of external optical interfaces 107A-107Z includes a tunable laser and tunable optical filter or an optical splitter, and a wavelength selective switch (WSS), configured to implement dense wave division multiplexing (DWDM). Optical fabric 106 and interfaces 107A-107Z are used in some embodiments as an all-optical cross-connect to perform lambda switching within shelf 100, to switch any wavelength from any of interfaces 107A-107Z to any of the other interfaces 107A-107Z, to implement OOO switching. Moreover, electrical-optical inter-fabric circuitry 105A-105M (e.g. LMX) are used in some embodiments in combination with optical fabric 106 and its interfaces 107A-107Z (e.g. LXC) to terminate a wavelength and recover electrical signal(s), followed by retransmitting the electrical signal(s) on the same or different wavelength, to implement OEO switching.

In the certain embodiments, electrical fabric 104 in single shelf 100 is also implemented as a crossbar (FIG. 5D), although in the electrical domain. The electrical fabric 104 switches electrical signals (a) that are recovered from lambdas and/or (b) that will be converted into lambdas. The electrical fabric 104 and electrical-optical inter-fabric circuitry 105A-105M implement switching in a layer below lambda switching in the optical domain. Hence electrical fabric 104 and its interfaces in circuitry 105A-105M, 103A-103Y, 108A-108P are together referred to herein as a sub-lambda electrical switch. The electrical fabric 104 supports switching of any format electrical signals, independent of content therein. Specifically, the electrical fabric 104 does not distinguish between an electrical signal that carries TDM data and another electrical signal that carries packet(s) and/or fragments of packets.

In the certain embodiments, a packet fabric 102 (FIG. 3A) in shelf 100 includes a switch fabric. External interfaces 101A-101X to packet fabric 102 include traffic managers that classify packets to be switched by packet fabric 102, and form flows that are directed to specific destinations within the shelf. To improve efficiency in use of the switch fabric, packets are fragmented by the traffic managers and thereafter transferred across the switch fabric to traffic managers in other packet fabric interfaces 101A-101X or to inter-fabric circuitry 103A-103Y that bridges the packet fabric to the electrical fabric. Traffic managers in the packet-electrical inter-fabric circuitry 103A-103Y reassemble packet fragments into whole packets, and before transferring each packet through the transport network.

Operation of shelf 100 is now described in the example shown in FIG. 3A. Specifically, shelf 100 has a service interface 107A coupled externally via a router to a content provider that supplies an optical signal containing for example, video content of interest to various end users. Packets within such an optical signal at service interface 107A need to be retrieved prior to being routed to the appropriate end user. Hence the optical signal is first terminated in a selected one of optical-electrical inter-fabric circuitry 105A . . . 105M. The specific circuitry which is used for termination of this optical signal is provisioned by a network controller 120 of the telecommunications carrier that manages shelf 100. Next, the electrical signal which has been retrieved (from the optical signal) is itself switched via electrical fabric 104 to one of the packet-electrical inter-fabric circuitry 103A-103Y. The identity of which circuitry is to be used for termination of an electrical signal to recover packets is provisionable by network controller 120. The packets are thereafter switched by packet fabric 102 to a suitable one of the packet-electrical inter-fabric circuitries 103A-103Y.

The packet-electrical inter-fabric circuitry creates an electrical signal and switches the electrical signal through the electrical fabric 104 to an appropriate one of the optical-electrical inter-fabric circuitries 105A-105M. The electrical-optical inter-fabric circuitry creates an optical signal that is switched by the optical fabric to an appropriate one of the external optical interfaces 107A-107Z, followed by transmission via the rest of the transport network, e.g. to a destination shelf 110. Shelf 110 to which an end-user is coupled is similar or identical in architecture to the above-described single shelf 100, and operates similarly.

In certain embodiments, inter-fabric circuitries add information prior to transmission of packets and/or electrical signals through the transport network. Specifically, prior to conversion into a lambda, electrical-optical inter-fabric circuitry 105A-105M frames an electrical signal by adding bits/bytes. The framing which is added to an electrical signal includes extra redundant bytes to be used by a destination shelf (where the lambda is terminated) to detect and correct errors in the received signal, so that the original signal (prior to framing) is recovered.

In one illustrative embodiment, the extra redundant bytes are used by a destination shelf to implement a forward error correction (FEC) technique to increase the signal to noise ratio (relative to the uncorrected signal) to a level sufficient to overcome Optical Signal to Noise Ratio (OSNR) degradation arising from the lambda traversing one or more OADMs without regeneration. While any forward error correction technique can be used in various embodiments of the invention, one embodiment of electrical-optical inter-fabric circuitry 105A-105M adds industry-standard framing, as described in ITU-T G.709 entitled, "Interface for the optical transport network (OTN)".

Hence one embodiment adds framing bits using Reed-Solomon code RS(255,239) with 8-bit symbols, wherein 239 is the number of symbols, and 255 is the total number of symbols per codeword, and each codeword consists of data and parity (also known as check symbols) that are added. In this embodiment, a G.709 framer maps four OC48 signals into four ODU1 frames, and thereafter maps the four ODU1 frames into a single ODU2 frame, that is then supplied as an OTU2 signal to an optical transceiver for creation of a lambda.

Moreover, packet-electrical inter-fabric circuitry 103A-103Y of some embodiments add a new header that is local to the transport network, for use in transmission of a flow of packets in a connection oriented manner through intermediate nodes in the transport network. In one illustrative embodiment, the original packets are Ethernet frames that contain media access layer (MAC) headers, and new headers (also called backbone MAC headers) have the same structure as Ethernet's MAC header. Specifically, traffic managers of packet-electrical inter-fabric circuitry 103A-103Y of some embodiments implement MAC-in-MAC encapsulation of each packet, after classification etc.

A flow of encapsulated packets through the transport network follows a path identified in each intermediate node based on one or more field(s) in the backbone MAC header until the destination is reached. One embodiment uses the backbone MAC address and the backbone VLAN id and performs a 60-bit lookup to identify the path. At the destination, the backbone MAC header is stripped off from the packets which are thereafter forwarded to an end user who's outside the transport network, in the normal manner. The path for each flow through the transport network is provisioned at each intermediate node through which an encapsulated packet passes. The provisioning is done by a network controller of a telecommunications carrier that operates the transport network. Provisioning of paths for MAC-in-MAC encapsulated packets eliminates the need for Ethernet discovery mechanisms, which are not used to route one packet at a time through the transport network.

Depending on the embodiment, packet-electrical inter-fabric circuitry 103A-103Y may be implemented in conformance with any known protocol, such as Provider Backbone Bridges (PBB) and/or Provider Backbone Transport (PBT), and/or Provider Backbone Bridging-Traffic Engineering (PBB-TE). PBB-TE is currently being standardized by the IEEE 802.1 Qay task force, e.g. as described in Draft 2.0 specification that has been released recently. PBB-TE operation which is used in one embodiment of the invention differs from PBB as follows. In PBB, the backbone MAC header's VLAN identifier B-VID identifies a packet flooding domain which interconnects different PB networks. In the PBB-TE, the B-VID in combination with the backbone MAC header's destination address B-DA address, identifies a specific path through the transport network. The specific path which is identified in PBB-TE is provisioned by a network controller that manages network elements in the transport network. In one embodiment, nodes (e.g. along a path in the transport network) register their MAC addresses with a network controller which authorizes the MAC addresses and records the topological location of the registered nodes. Next, when a path is to be set up, the source and destination nodes each send a connection request to the network controller. In response, the network controller decides on the path (using any path determination method) and makes forwarding entries along the path in the nodes at intermediate locations, and if appropriate notifies the source and destination nodes.

In certain embodiments, the network controller is aware of the configuration of shelf 100, and a packet received on any service interface of the shelf is switchable (by appropriate provisioning of shelf 100), to any lambda on trunk interface 107Z. Similarly, a packet embedded in any lambda received at any trunk interface can be recovered by shelf 100 and sent out on any service interface 101A-101X and 108A-108P. Therefore, such lambda-aware switching of packets by shelf 100, as provisioned by the network controller optimizes the use of a lambda at the level of packets. Such optimization is believed to be nowhere disclosed or rendered obvious by any prior art known to the inventor(s).

Figure 3B:
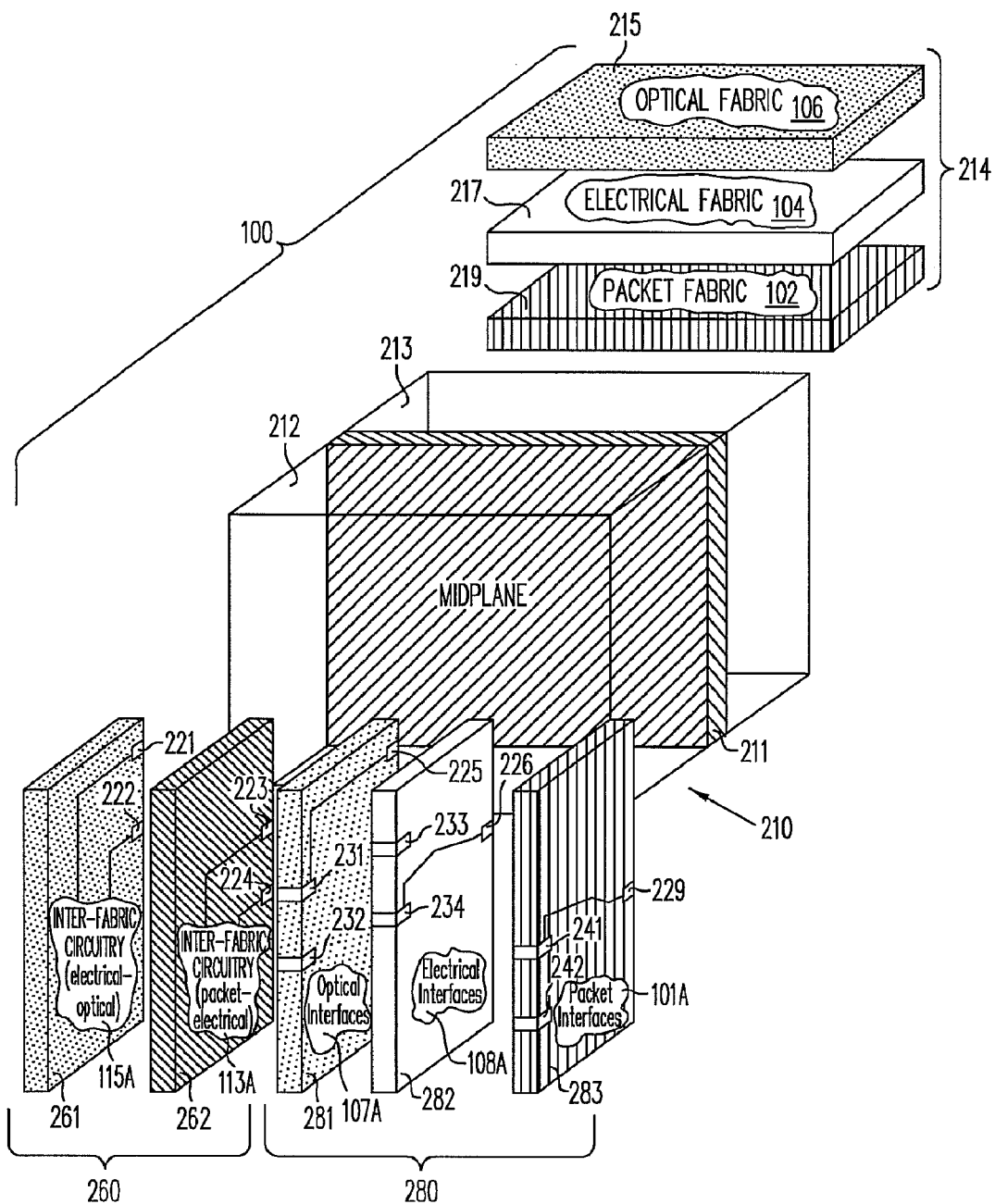
FIGS. 3B and 3C each illustrate physical layout inside a single shelf in alternative embodiments in accordance with the invention, wherein fabrics are located in a rear region and inter-fabric circuitry and external interfaces are located in a front region, with a midplane between the two regions.
Figure 3C:
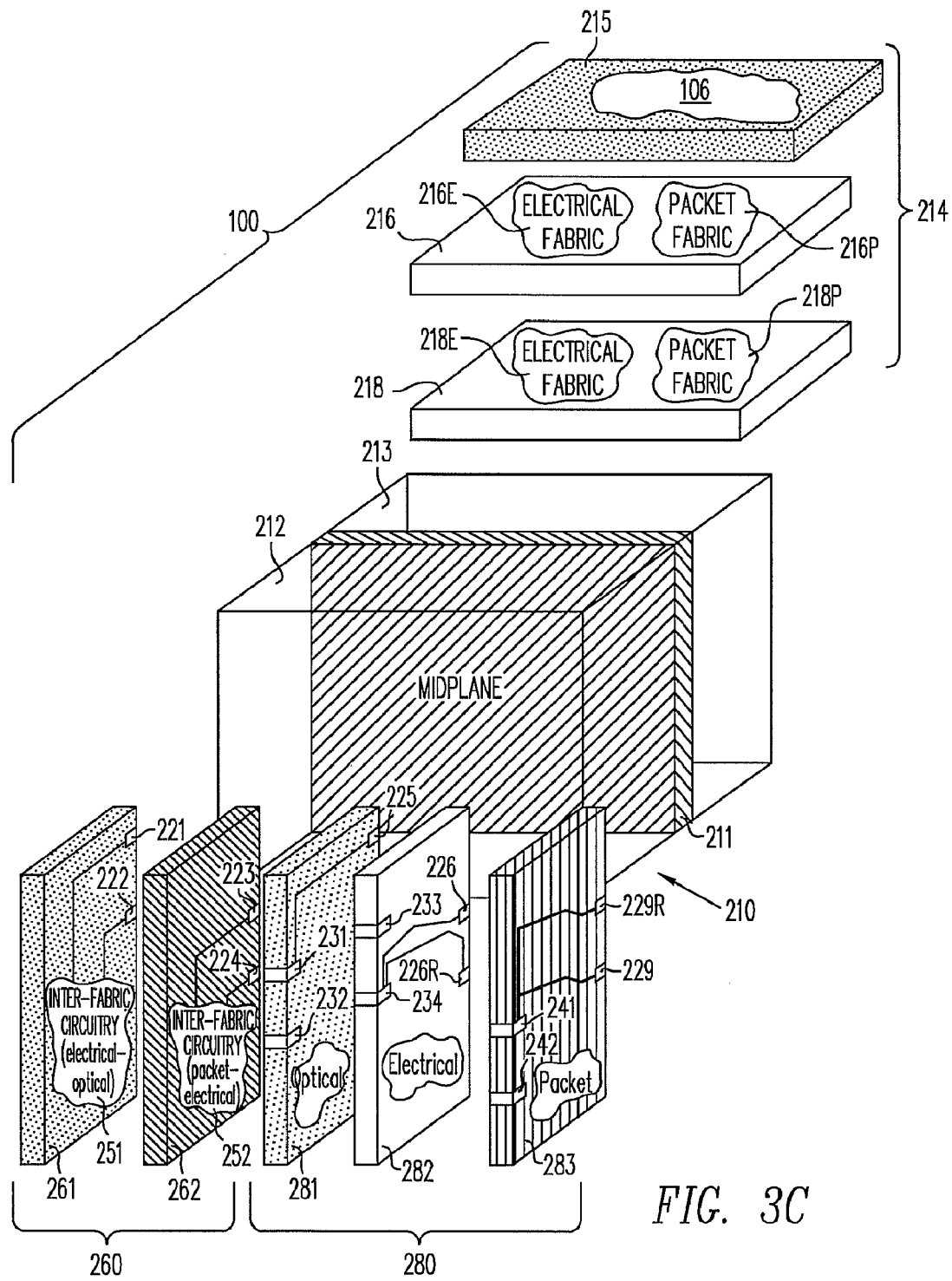
Figure 3D:
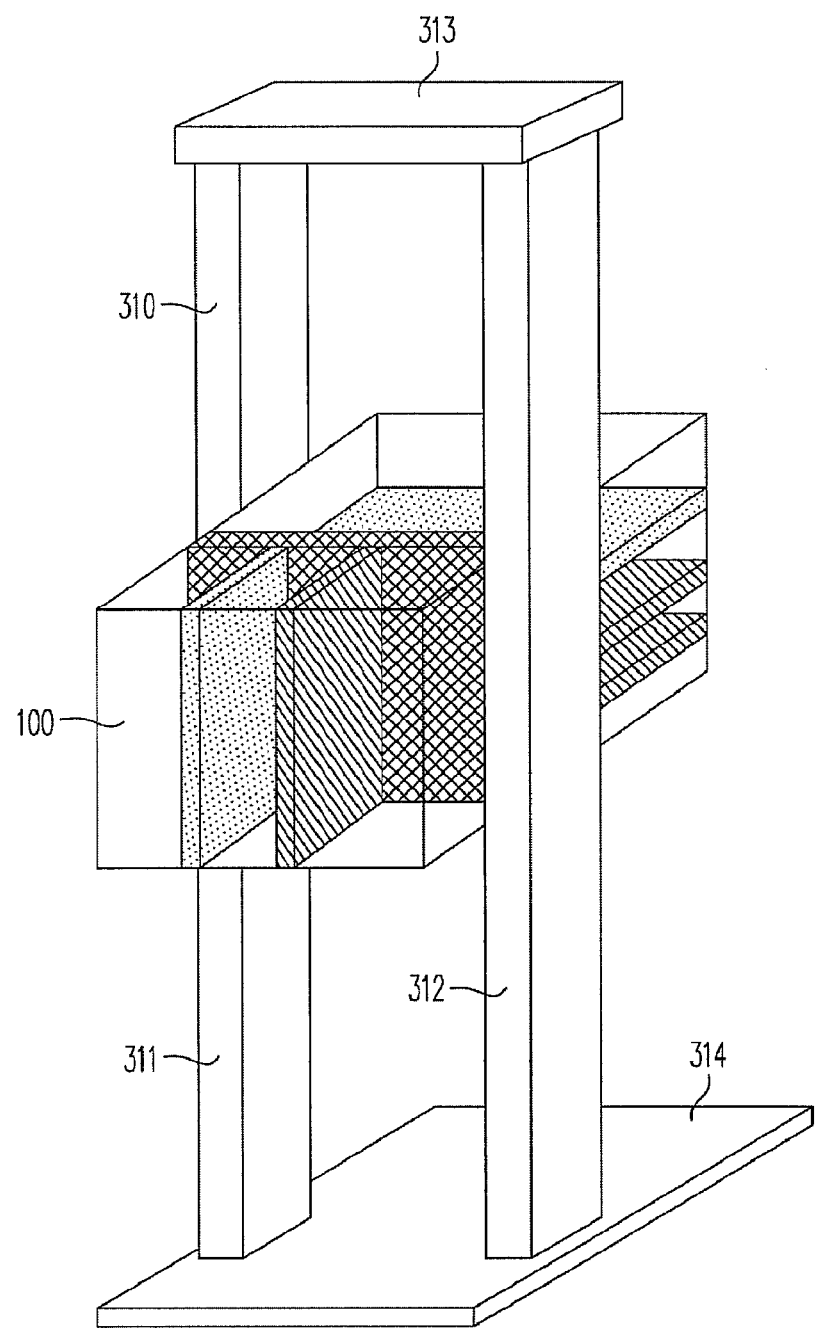
FIG. 3D illustrates the shelf of FIGS. 3B and 3C mounted in a telco rack.

Inclusion of three fabrics 102, 104 and 105 all within a single shelf (which fits in a telco rack as shown in FIG. 3D) has numerous advantages in switching traffic of a transport network, as compared to network elements that use only two fabrics or use only one fabric within a shelf. Firstly, use of a one-fabric network element or a two-fabric network element in a transport network that uses three multiplex technologies requires traffic to be prepared for transfer between two or more shelves. So, external interfaces are required on the two-fabric or one-fabric shelf just to externalize the traffic to be transferred therebetween, which adds cost. In contrast, inter-shelf traffic conditioning and related external interfaces are eliminated if a network element that receives a signal multiplexed in three ways contains three (or more) types of fabrics in accordance with the invention. Secondly, inter-shelf configuration changes require manual labor to patch optical fibers between two-fabric network elements and/or one-fabric network elements. Such manual labor is eliminated when provisioning a shelf (via keyboard) in a network that uses three multiplex technologies if the shelf internally holds three or more types of fabrics in accordance with the invention.

Thirdly, errors can arise in communication and/or performance of manual patching of a fiber between single-fabric or two-fabric shelves. Such errors are eliminated by a network controller remotely and automatically provisioning a shelf that internally holds three or more types of fabrics in accordance with the invention. Fourthly, single-fabric shelves of different types are typically sold by different equipment vendors, and do not necessarily inter-operate. System integration is eliminated by use of a single shelf holding three or more types of fabrics, because the fabrics exchange traffic among each other via inter-fabric circuitry also included within the same single shelf. Fifthly, presence of three or more types of fabrics in the same shelf enables optimization across three or more fabrics to a level unattainable by optimization limited to two fabrics. For example, two flows of packets that are respectively received at two external interfaces of a three-fabric shelf in accordance with the invention can be placed on the same lambda, by appropriate provisioning. Such optimization of a lambda at the packet level in a transport network is believed to be nowhere disclosed or rendered obvious by any prior art known to the inventors.

In one illustrative embodiment, a shelf 100 (FIG. 3B) has a midplane 211 between a front region 222 and a rear region 223 of shelf 100. Rear region 223 houses the fabrics 102, 104 and 106 while front region 222 houses inter-fabric circuitries 113A and 115A and external interface circuitries 101A, 108A and 107A. In the illustrative embodiment shown in FIG. 3B, each of packet fabric 102, electrical fabric 104 and optical fabric 106 is built into its own module, namely packet fabric module 219, electrical fabric module 217 and optical fabric module 215. Note that modules 215, 217 and 219 (collectively referred to as fabric modules 214) are oriented horizontally in chassis 210, parallel to a floor thereof, and perpendicular to midplane 211.

Also, in this embodiment, the electrical-optical inter-fabric circuitry 115A is built into its own module 261 that is housed in front region 212. Moreover, packet-electrical inter-fabric circuitry 113A is built into its own module 262 that is also housed in front region 212. Modules 261 and 262 (together referred to as inter-fabric modules 260) are oriented vertically relative to fabric modules 214, parallel to the sides of chassis 210, and perpendicular to midplane 211. For example, if midplane 211 is vertical and in the East-West direction, then inter-fabric modules 260 are also vertical but in the North-South direction. Fabric modules 214 are oriented horizontally and perpendicular to modules 260 as well as perpendicular to midplane 211. The just-described orientation is deliberately chosen in this embodiment to provide maximum connectivity between inter-fabric modules 260 and fabric modules 214, across midplane 211.

Note that midplane 211 of this embodiment does not have any active circuitry to affect the optical signals and electrical signals that travel between rear region 213 and front region 212. Midplane 211 has built in electrical connectors and optical connectors (not shown in FIG. 3B) that passively couple connectors on modules in the rear region 213 to corresponding connectors on modules in front region 212. In one illustrative embodiment, midplane 211 has an upper row of optical connectors, and four rows of electrical connectors (all not shown in FIG. 3B) through which horizontally oriented modules 215, 217 and 219 in rear region 213 are connected to vertically oriented modules 260 and 280 in front region 212. Other embodiments use other spatial arrangements of connectors in midplane 211, e.g. optical connectors are in a bottom row in one embodiment while being in a middle row in another embodiment.

In embodiment shown in FIG. 3B, inter-fabric circuitry 115A is electrically connected to a connector 221 on module 261. Connector 221 in turn is optically coupled through midplane 211 to optical fabric 106 on module 215. Inter-fabric circuitry 115A is also electrically connected to a connector 222 on module 261. Connector 222 in turn is electrically coupled through midplane 211 to electrical fabric 104 on module 217. Accordingly, inter-fabric circuitry 115A can perform a bridging function between optical fabric 106 and electrical fabric 104.

Also in this embodiment, inter-fabric circuitry 113A is electrically connected to a connector 223 on module 262. Connector 223 in turn is electrically coupled through midplane 211 to electrical fabric 104 on module 217. Inter-fabric circuitry 113A is also electrically connected to a connector 224 also on module 262. Connector 224 is electrically coupled through midplane 211 to packet fabric 102 on module 217. Accordingly, inter-fabric circuitry 113A can perform a bridging function between packet fabric 102 and electrical fabric 104.

The embodiment shown in FIG. 3B also has a number of interfaces that transfer signals external to shelf 100, namely optical interfaces 107A, electrical interfaces 108A and packet interfaces 101A that are respectively built into their own modules 281, 282 and 283 (collectively referred to as external interface modules 280). Modules 281, 282 and 283 support several different types of services, such as a packet stream in the form of 10 Gigabit Ethernet, a TDM stream in the form of OC48 and OTU1 or STM16. Each of modules 281, 282 and 283 has an appropriate one of connectors 225, 226 and 229 that are respectively coupled to corresponding fabrics 106, 104 and 102 on respective modules 215, 217 and 219. Modules 280 are located in front region 212 of chassis 210 of shelf 100, oriented vertically in shelf 100, parallel to modules 260.

Note that a floor and a roof of chassis 210 has a predetermined number N of slots in front region 212 that are flexibly used to accommodate any number I of inter-fabric modules 260 and any number E of external interface modules 280, such that N=E+I. For example, if shelf 100 is to be used strictly as an all-optical cross-connect, all the slots are used to hold optical external interface modules.

Figure 3E:
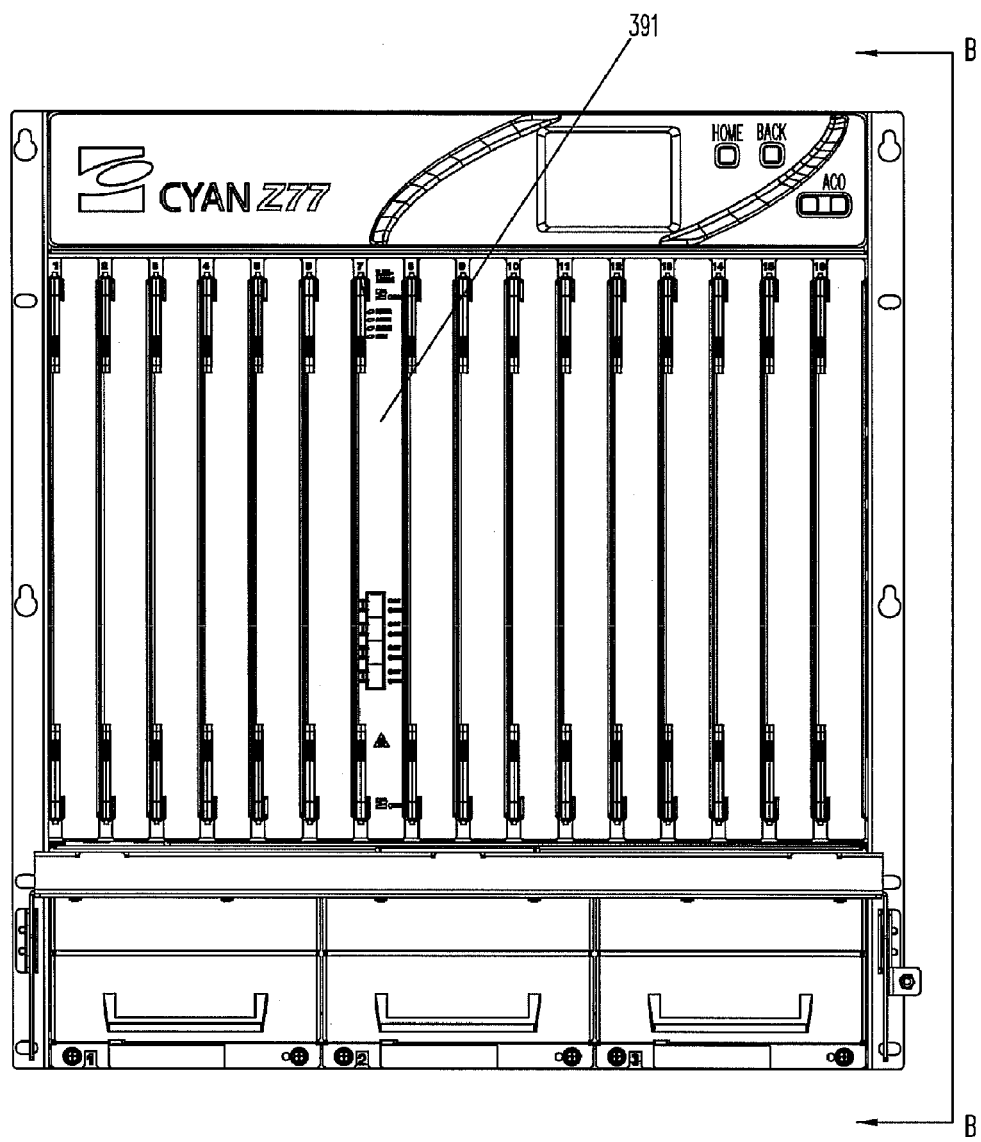
FIG. 3E illustrates a front view of a shelf in one illustrative embodiment in accordance with the invention.

Shelf 100 has width and depth sufficient to fit within a telco rack 310 (FIG. 3D). Telco rack 310 may be a 7 foot tall open frame consisting of two posts 311 and 312 separated from each other by 23 inches or 600 mm, mounted on a base 314 and connected at the top by a cross-bar 313. Rack 310 is usually bolted to the floor in a central office of a telecommunications carrier. In one embodiment, shelf 100 conforms to Advanced Telecom Computing Architecture (ATCA), a series of industry specification standards for next generation carrier grade communications equipment, such as ATCA 3.0. The ATCA specification defines the physical and electrical characteristics of such as rack and shelf form factors, power, cooling, management interfaces, and the electromechanical specification of ATCA-compliant boards. FIG. 3E illustrates a front view of shelf 100 of one embodiment that holds a total of sixteen modules (such as LMX module 391) shown oriented vertically.

In another embodiment shown in FIG. 3C packet and electrical fabrics 216P and 216E are both built into a single module, called hybrid fabric module 216. In FIG. 3C, optical fabric 106 has its own optical fabric module 215. Rear region 213 of the alternative embodiment has another hybrid fabric module 218 that also has its own packet and electrical fabrics 218P and 218E. In this embodiment, hybrid fabric module 218 is used as a hot-standby for hybrid fabric module 216, for protection switching in case of a failure in hybrid fabric module 216. Accordingly, modules 260 and 280 of FIG. 3C have additional connectors or additional pins, if appropriate (relative to FIG. 3B) to connect to each of modules 216 and 218. For example, module 282 has two connectors 226 and 226R while module 283 also has two connectors 229 and 229R.

Electrical connectors in the midplane 211 can be, for example, Molex I-Trac connectors which eliminate the need for PCB-type traces in the midplane. Note that the same type of electrical connectors are used in connecting through the midplane to each of two fabrics, namely packet fabric and electrical fabric. One illustrative embodiment utilizes a 6×6 connector that allows for 36 differential pairs per connector. The connector supports serial data rates of up to 12 Gbps.

Figure 4A:
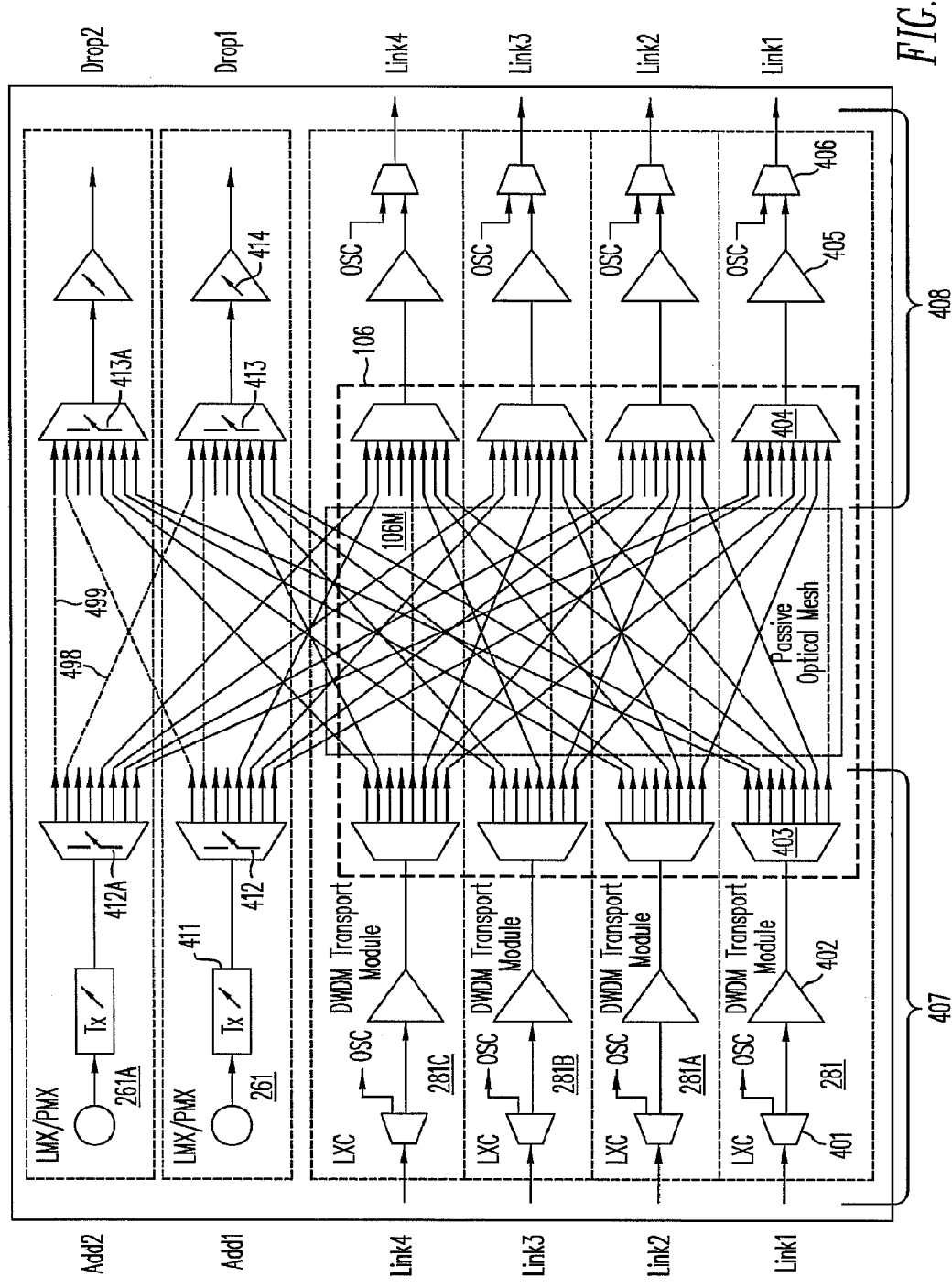
FIG. 4A illustrates, in a block diagram, a wavelength selective switch and optical cross-connect implemented within a shelf of in some embodiments of the invention.

In still another embodiment (see FIG. 6B), a total of five modules are arranged horizontally in rear region 223 of shelf 100, including one optical fabric module and four hybrid fabric modules (as noted above in reference to FIG. 3C, each of the hybrid fabric modules has an electrical fabric and a packet fabric). Module 281 (FIG. 3C) of some embodiments is a DWDM transport module which has an ingress portion 407 and an egress portion 408 coupled to the optical fibers of an external trunk, labeled "Link1" in FIG. 4A. Internal to shelf 100, both portions 407 and 408 are coupled to optical fabric 106 that is implemented as a passive optical mesh. Optical fabric 106 provides optical connectivity between all slots in shelf 100 except for slot(s) used for shelf control (as there are no optical signals transferred to/from card(s) that manage the shelf). Note that the term "module" is interchangeable with the term "line card", e.g. optical modules 281, 281A-281C, 261 and 261A of FIG. 4A are also referred to as optical "line cards."

Ingress portion 407 of module 281 includes an optical demultiplexer 401 that splits off an portion of the optical signal at a predetermined wavelength, called "optical supervisory channel" which is used to communicate with other nodes in the transport network (e.g. the source node for the signal on "Link1"). Next, the optical signal is amplified by an optical amplifier 402 in module 281, to compensate for losses on the optical fibers of the trunk "Link1." Thereafter, the optical signal is split by a splitter 403 in module 281, and a copy resulting from splitting is supplied via optical fabric 106 to each of modules 281A-281C, 261 and 261A that are connected to optical fabric 106.

Note that a copy of the optical signal is also received back from optical fabric 106 in module 281, specifically in egress portion 408. Egress portion 408 also receives optical signals from each of modules 281A-281C, 261 and 261A that are connected to optical fabric 106. A wavelength selective switch 404 in egress portion 408 is used to select appropriate lambdas (one of each wavelength) that are together supplied to an optical amplifier 405. Egress portion 408 also includes an optical multiplexer 406 that adds an optical supervisory channel and the resulting signal is then transmitted on the trunk Link1.

Accordingly, modules 281, 281A, 281B and 281C together with fabric 106 form an all-optical cross-connect (also called lambda cross-connect) in shelf 100. Note that although only four all-optical modules 281, 281A, 281B and 281C are illustrated, shelf 100 can accommodate up to seven all-optical modules, with each all-optical module occupying two slots in shelf 100.

Shelf 100 is illustrated in FIG. 4A as having inter-fabric modules 261 and 261A that are optically connected to optical fabric 106. Module 261 contains a tunable laser 411 for conversion of an electrical signal into an optical signal at a selected wavelength. Module 261 also includes a splitter 412 that splits the optical signal to form copies for transmission by optical fabric 106 to each of modules 281, and 281A-281C that are connected to optical fabric 106. Module 261 receives multichannel signals from the optical fabric 106 at a tunable filter 413 that selects one of the lambdas, followed by conversion into an electrical signal by a receiver 414. Note that receiver 414 and laser 411 are typically housed in a single integrated package on module 261, such as a 300-pin 10 Gbps optical transceiver.

In FIG. 4A, inter-fabric module 261 has only 4 outputs (at splitter 412) and 4 inputs (at tunable filter 413) to/from optical fabric 106 of the illustrative embodiment. Similarly, inter-fabric module 261A also has only 4 outputs and 4 inputs to/from optical fabric 106. The four ports in the illustrative embodiment connect each of modules 261 and 261A to modules 281, 281A, 281B and 281C (i.e. Link1-4). Accordingly, in the illustrative embodiment, modules 261 and 261A are optically connected only to modules 281, and 281A-281C. Specifically, in the illustrative embodiment modules 261 and 261A do not have optical connections among themselves, e.g. between their own splitters 412, 412A and tunable filters 413 and 413A respectively. Also in the illustrative embodiment, a given each of modules 281, 281A, 281B and 281C do not have their own internal optical connection between the respective splitter 403 and wavelength selective switch 404. However, an optical mesh 106M within optical fabric 106 has sufficient optical links to enable another embodiment having such optical connections (shown dotted in FIG. 4A), such as connection 499 within module 261A itself, and connection 498 between module 261A and 261. In one example of the embodiment shown in FIG. 4A without the internal optical connections, a wavelength selective switch 404 is provisionable to select 40 lambdas, from among 6 lambdas that are received from six inter-fabric modules 261,261A . . . and from among 120 lambdas that are received from three all-optical modules 281A, 281B and 281C.

Figure 4B:
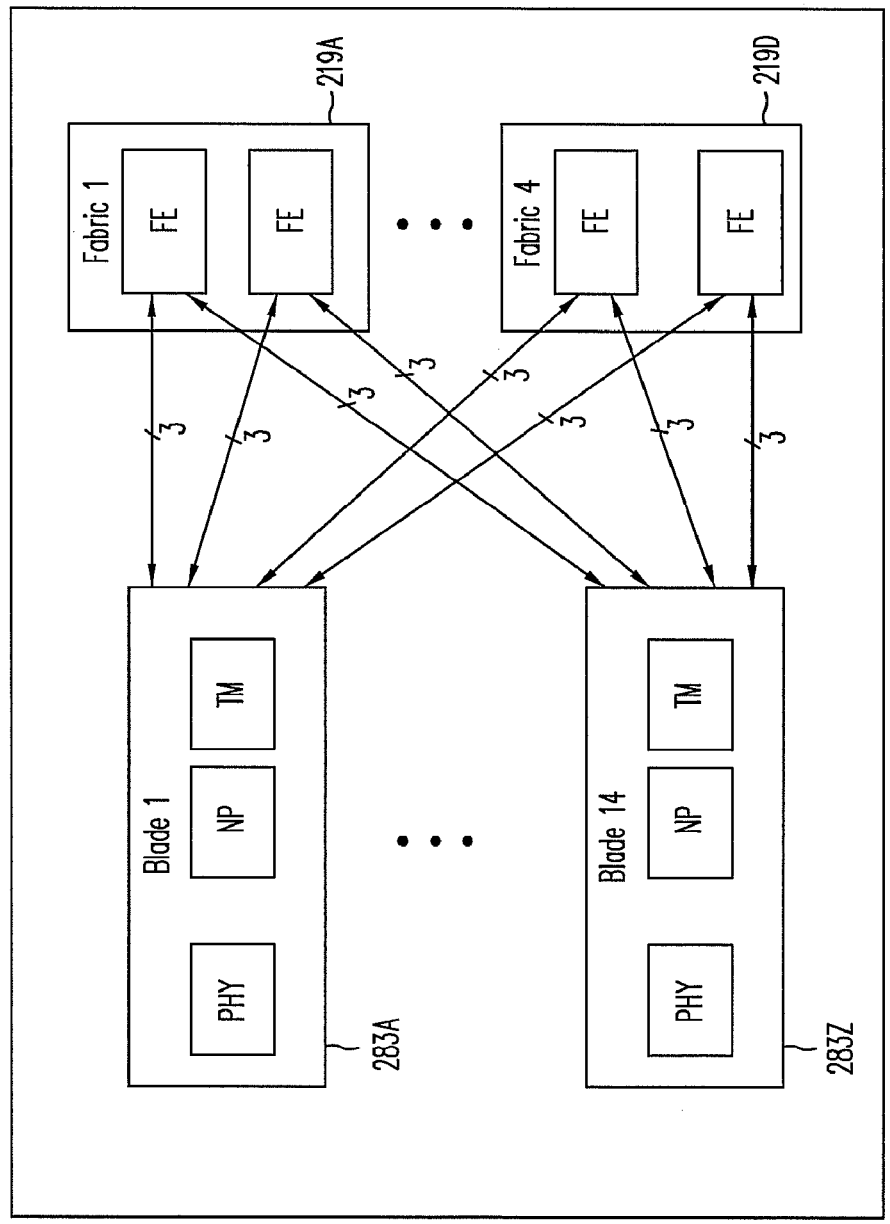
FIG. 4B illustrates, in a block diagram, a packet fabric implemented within a shelf of in some embodiments of the invention.

Shelf 100 in one embodiment illustrated in FIG. 4B has four packet fabric modules 219A-219D labeled "Fabric1" . . . "Fabric4" located in the rear region of shelf 100. Modules 219A-219D may be coupled across the midplane to fourteen packet interface modules 283A-283Z labeled "Blade1" . . . "Blade14" if present in fourteen slots available in the front region of shelf 100. Each of packet interface modules 283A-283Z handles packet traffic at 20 Gbps rate, e.g. from two 10 GigE links external to shelf 100. Each packet interface module 283A-283Z includes two "phy" devices that receive electrical signals from 10 GigE links, a network processor "NP" and a traffic manager "TM". Each of packet interface module 283A-283Z has four electrical connectors connected across the midplane to the respective packet fabric modules Fabric1 . . . Fabric4. Each packet fabric module has two switch fabrics "FE" that switch packets in a non-blocking manner. Each switch fabric FE is connected to three full-duplex ports in each packet interface module 283A-283Z. Each full-duplex port transmits and receives a 3.125 Gps serial signal, so that each switch fabric FE receives a 10 Gbps signal from each packet interface module 283A-283Z.

Figure 4C:
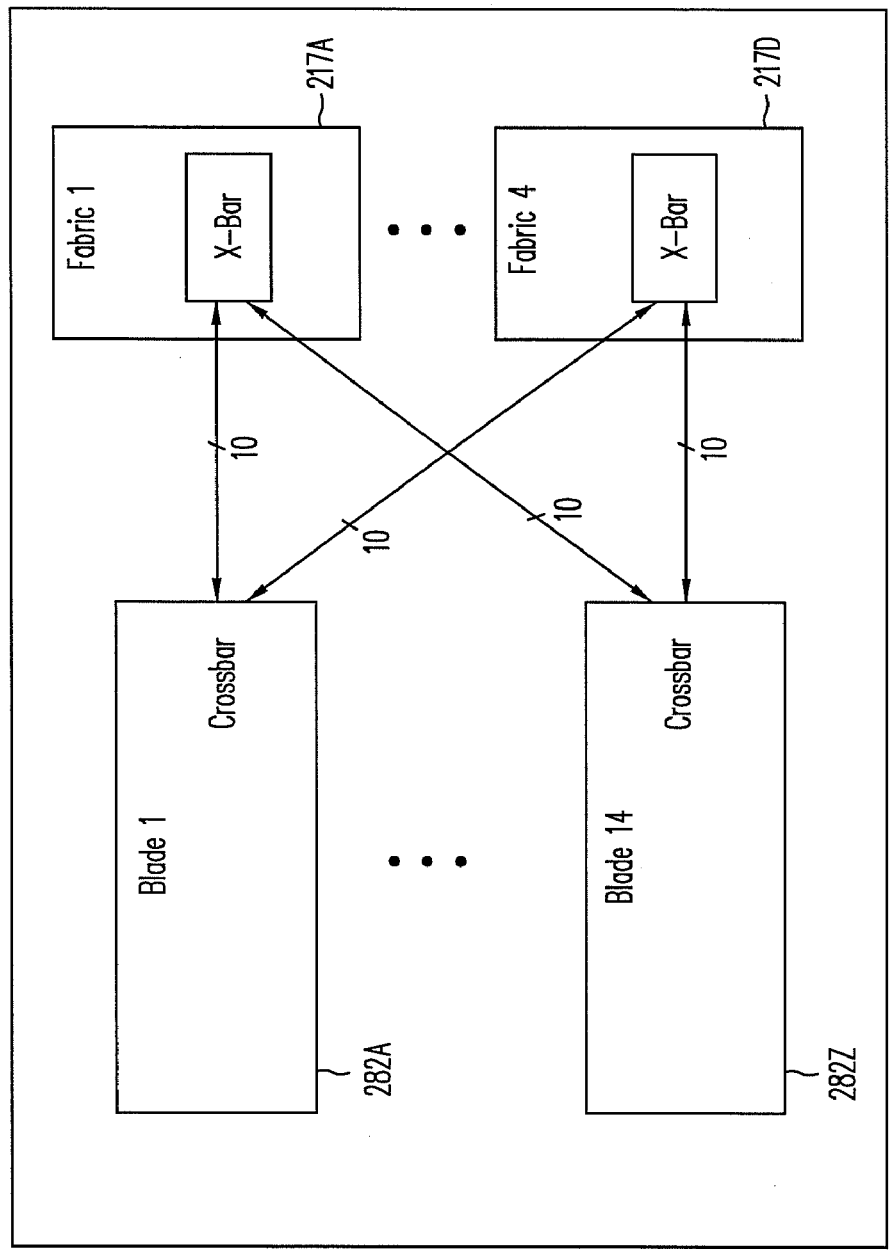
FIG. 4C illustrates, in a block diagram, an electrical fabric implemented as a crossbar within a shelf of in some embodiments of the invention.

Note that instead of using fourteen packet interface modules, shelf 100 may be used to house fourteen electrical interface modules 282A-282Z as illustrated in FIG. 4C. Accordingly, fourteen electrical interface modules 282A-282Z may be connected across the midplane to the four electrical fabric modules 217A-217D in the rear region of shelf 100. In one embodiment, each of the four hybrid fabric modules 217A-217D includes an electrical crossbar labeled "X-Bar". Each electrical crossbar has a group of ten full-duplex ports connected to each of the fourteen electrical interface modules 282A-282Z. Each full-duplex port can receive and transmit a 2.4 Gbps serial signal in one embodiment. Each one of modules 282A-282Z has 10 serial links to each of the four fabric modules 282A-282Z for a total of 40 links, i.e. 20 protected links per blade (i.e. per slot). In electrical fabric modules 217A-217D, each electrical crossbar transfers an electrical signal at any of its input ports to any of its output ports, regardless of content within the signal. Specifically, each electrical crossbar operates at the electrical level (analog) and not at data level (digital). The analog electrical crossbar does not do clock recovery, data recover or CRC check. Instead, the electrical signal received by the electrical crossbar is amplified at predetermined frequencies and re-shaped. Accordingly, the electrical crossbar may be used to switch an electrical signal that carries TDM traffic, and just as easily as an electrical signal that carries packet traffic.

Figure 4D:
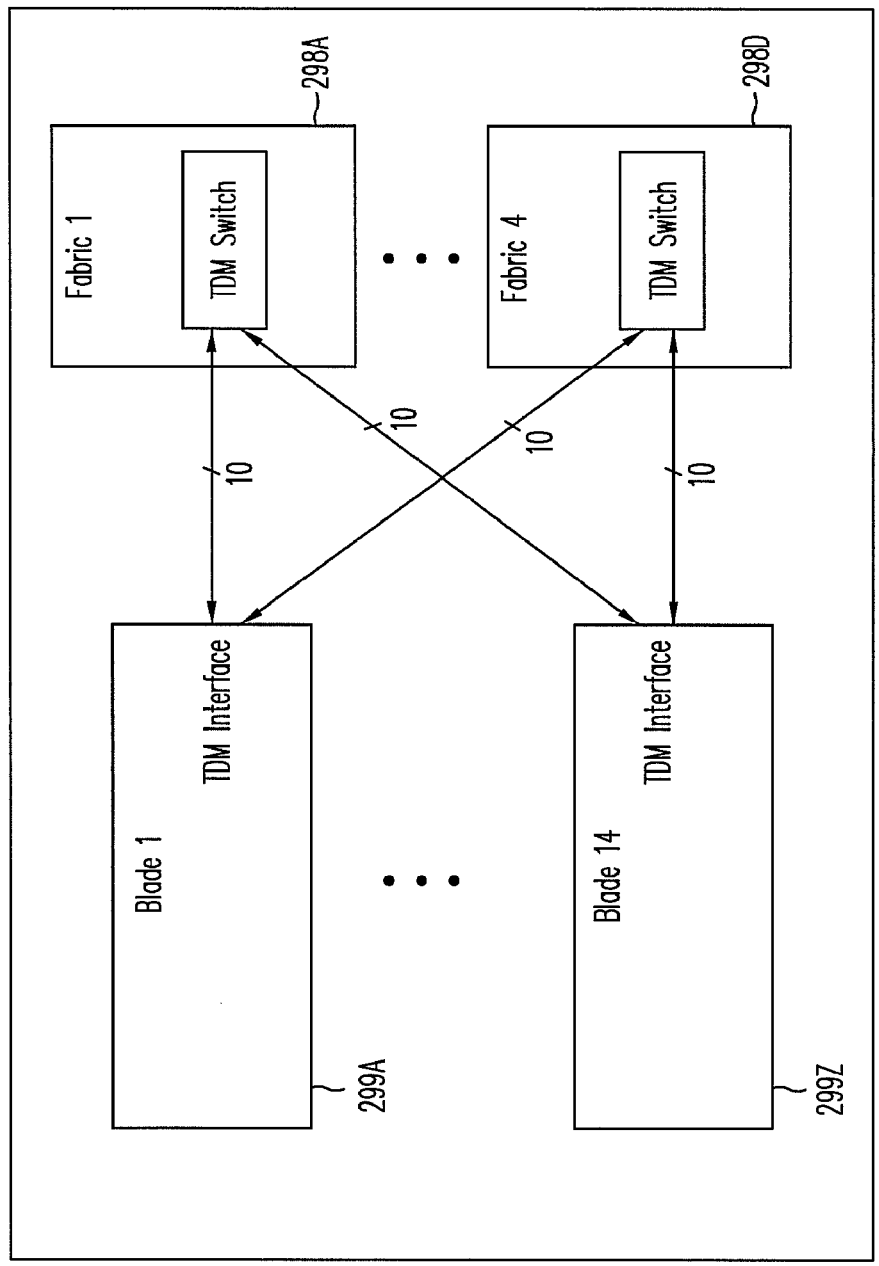
FIG. 4D illustrates, in a block diagram, an electrical fabric implemented as a TDM fabric within a shelf of in some embodiments of the invention.

In another embodiment illustrated in FIG. 4D, each of the four fabric modules 298A-298D includes a time space switch matrix that is aware of TDM. The TDM switch in fabric modules 298A-298D can switch any granularity time-division-multiplexed signal, including SONET STS-1, SONET VT1.5 or OTN ODU-n. In this embodiment as well, each TDM switch of FIG. 4D has a group of ten full-duplex ports connected to each of the fourteen TDM interface modules 299A-299Z. TDM interface modules 299A-299Z, if present, are located in the fourteen slots available in the front region of shelf 100. An example of the TDM switch is PMC-Sierra's PM5377 TSE 240 that implements a memory switch fabric with STS-1/AU-3 switching granularity, with 96 ingress and 96 egress STS-48/STS-12 ports.

Figure 4E:
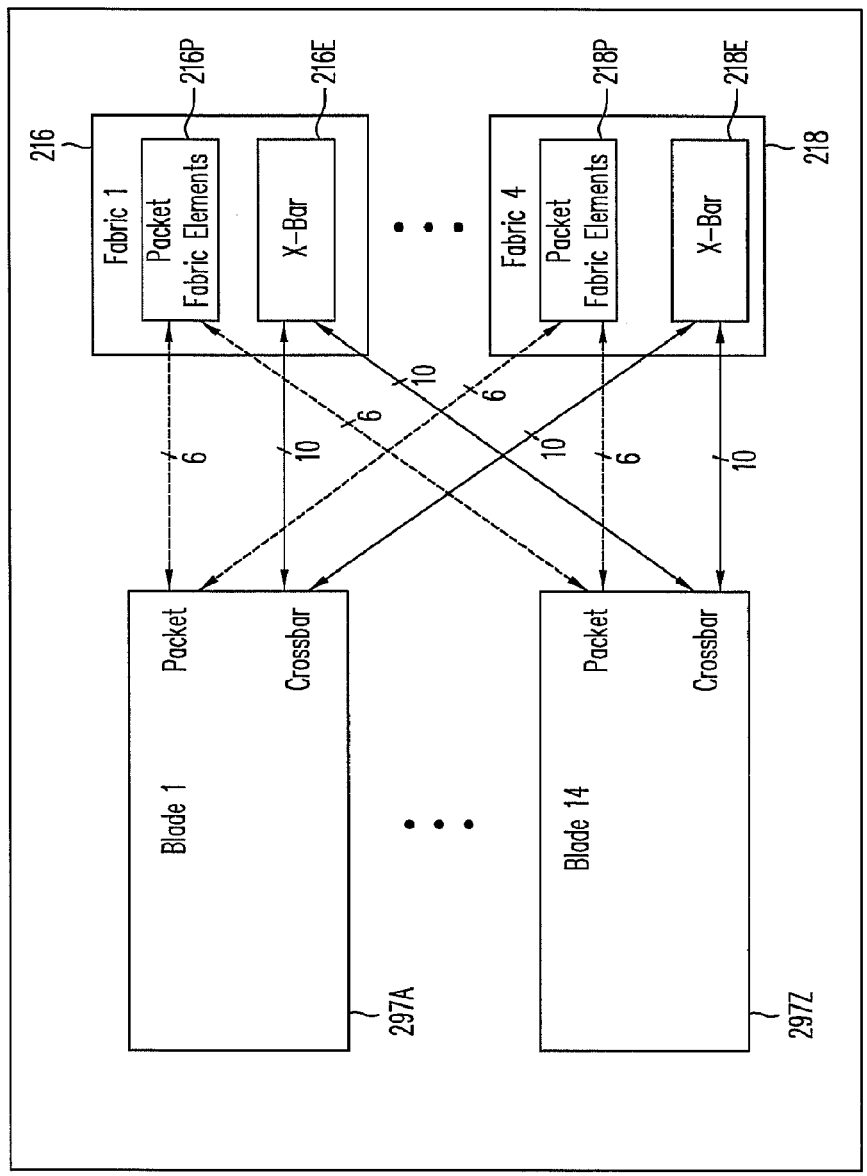
FIG. 4E illustrates, in a block diagram, a hybrid electrical and packet fabric implemented using a crossbar within a shelf of in some embodiments of the invention.

In an illustrative embodiment shown in FIG. 4E, a fabric module 216 has a packet fabric element 216P (implemented by two switch fabrics, not individually shown in FIG. 4E) and also has an electrical fabric implemented as an analog electrical crossbar 216E, as described above in reference to FIG. 3C. Each switch fabric has groups of three full-duplex ports (i.e. six ports for module 216), each group connected to a traffic manager in one of modules 297A-297Z. Each full-duplex port of the switch fabric carries a 3.125 Gbps serial signal. In addition, each crossbar has groups of five full-duplex ports (i.e. ten ports for module 216) that are connected to an electrical switch in each of modules 297A-297Z. Each full-duplex port of the crossbar also carries a 3.125 Gbps serial signal. Accordingly, the arrangement shown in FIG. 4E supports 20 Gbps per slot (i.e. per traffic manager) and as there are 14 slots in the shelf, the total packet capacity is 280 Gbps. Moreover, each one of modules 297A-297Z has 20 protected links per blade (i.e. per slot) connected to an analog electrical crossbar.

Figure 5A:
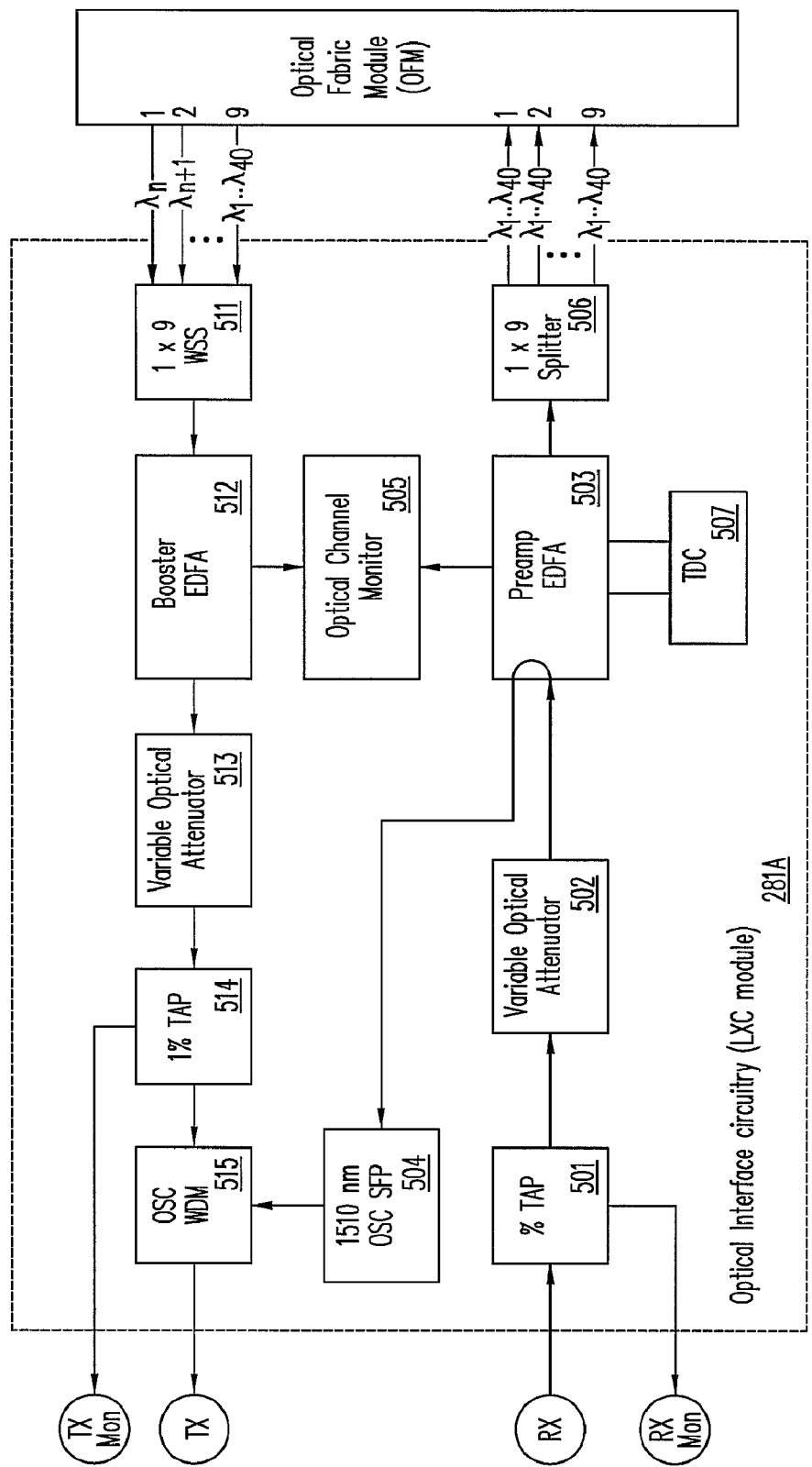
FIG. 5A illustrates an optical interface module (called "LXC") that interfaces optical signals from a trunk fiber (e.g. carrying forty lambdas in OCh format of OTN that have been wave division multiplexed) to the optical fabric in a shelf of some embodiments of the invention.
Figure 5B:
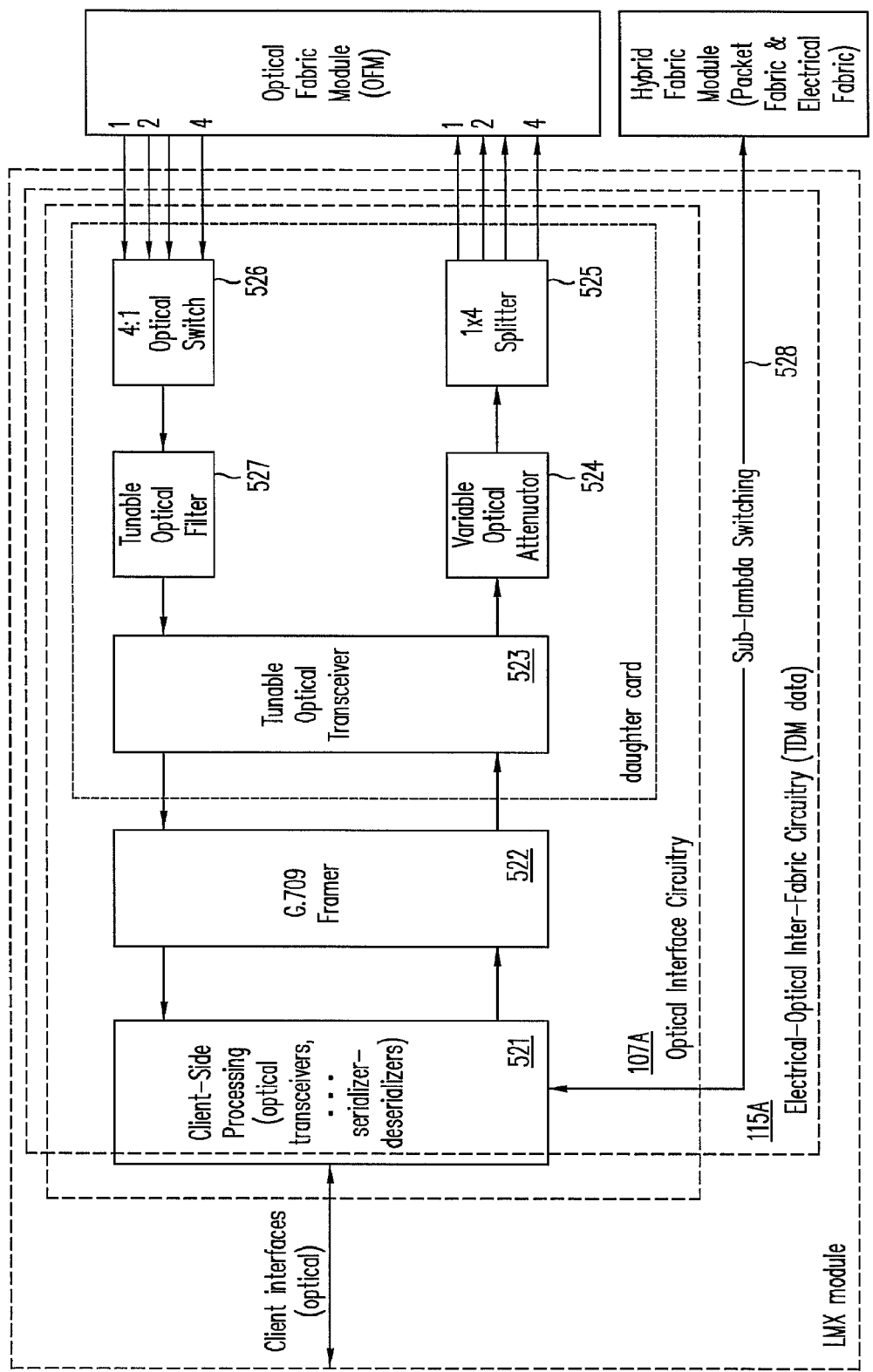
FIG. 5B illustrates another optical line card (called "LMX") that receives optical or electrical tributary signals (such as OC48 or STM 16 or OTU1) from outside the shelf and supplies them to the optical fabric in some embodiments of the invention.

Some embodiments of the invention use two kinds of optical interface modules, namely a trunk module "LXC" and a tributary module "LMX" respectively illustrated in FIGS. 5A and 5B which interface externally to a trunk in the transport network and a tributary to client premises respectively, and both modules interface internally to the optical fabric module. The trunk module "LXC" (FIG. 5A) includes an optical tap 501 to split off 1% of the signal back to the faceplate so that the telecommunication carrier can monitor it. Optically coupled to tap 501 and downstream therefrom is a variable optical attenuator 502 which can be used to appropriately change the signal strength, e.g. to avoid overload. Attenuator 502 is typically controlled by a microcontroller (not shown) which is included in the trunk module "LXC."

Optically coupled to attenuator 502 and downstream therefrom in the ingress direction is an optical preamplifier 503, such as an Er-doped fiber amplifier, or EDFA preamp, used to amplify a signal that has been attenuated by transmission over a long distance. Optically coupled to amplifier 503 is a tunable dispersion compensator 507 that performs dispersion compensation of the optical signal on a per-channel basis, and the compensated signal is then returned to amplifier 503. Depending on the embodiment, tunable dispersion compensator 507 can be fiber grating or chirped grating or Mach-Zehnder-interferometer. Examples of compensator 507 which may be used includes PowerShaper 3400 from Avanex and ClearSpectrum-TDC from Teraxion, Inc. While in one illustrative embodiment the tunable dispersion compensator ("TDC") is located within shelf 100, an alternative embodiment transfers all signals to be dispersion compensated to an external dispersion compensating fiber shelf. In the alternative embodiment, a Dispersion Compensation Module (DCM) is connected in place of the TDC, by using connectors on the faceplate of the LXC. An example of the DCM is the Avanex PowerForm DCM.

Optically coupled to preamplifier 503 is an OSC small formfactor pluggable (SFP) transceiver 504 that senses the optical supervisory channel (OSC) at a predetermined wavelength, e.g. 1510 nm for OTN. The power level of the incoming OSC signal as measured by transceiver 504 relative to the transmission power level of the outgoing OSC signal is used to automatically control attenuator 502, at a coarse level. A finer level control is performed by use of an optical channel monitor 505 which monitors the power level of each wavelength (for up to 40 lambdas for example) that are dense wave division multiplexed in the incoming optical signal. The optical signal is then supplied to a splitter 506 that splits the incoming optical signal into, for example, 9 copies, for transmission to each of 9 fibers of the optical fabric module.

In the egress path on trunk module "LXC", a wavelength selective switch 511 (FIG. 5A) receives a number of optical signals, e.g. 1 lambda from each of 6 fibers and 40 lambdas from each of 3 fibers. The 3 fibers carrying 40 lambdas originate in other trunk modules "LXC" whereas the 6 fibers carrying the single lambda originate in tributary modules "LMX." Tributary modules "LMX" are optically connected by the optical fabric in a star configuration, wherein each tributary module "LMX" is connected to all trunk modules "LXC". Trunk modules "LXC" are optically connected to one another in a mesh configuration.

All signals that arrive at wavelength selective switch 511 are at a nominal level of intensity. Wavelength selective switch 511 makes selections, of a number of lambdas (e.g. 40) from among all optical signals received from the optical fabric module. Next the selected lambdas are amplified by an amplifier 512 and after amplification a portion of the amplified optical signal is tapped off and monitored in the optical channel monitor 505. The intensity sensed in optical channel monitor 505 is used to set the attenuation for each individual wavelength, in wavelength selective switch 511.

Optical channel monitor 505 (FIG. 5A) operates in the electrical domain, converting the intensity at each lambda into an electrical signal that is sampled. Following the amplifier 512 in the egress path is another variable optical attenuator 513 which is currently unused but may be used if necessary. Optically coupled to attenuator 513 and downstream therefrom is another tap 514 that supplies 1% of the optical signal to the faceplate for monitoring purposes. Thereafter the optical signal is dense wave division multiplexed with the optical supervisory channel (OSC) by multiplexer 515.

The OSC signal which is added by multiplexer 515 is received in the trunk module "LXC" as an Ethernet signal, which is then supplied to transceiver 504 for conversion into an optical signal at the predetermined wavelength, e.g. 1510 nm for OTN. The Ethernet signal which is transmitted/received via the OSC channel contains management information communicated between shelves across the transport network. Note that up to seven trunk modules "LXC" may be used in shelf 100 if there are no tributary modules. Only up to four trunk modules "LXC" may be used in shelf 100 which has one or more tributary modules "LMX", so that the optical fabric provides access from each trunk module to all tributaries and all trunks. Tributary modules "LMX" (discussed next) have access to all trunks but no access to other tributaries in shelf 100. Hence, up to six tributary modules "LMX" may be present in shelf 100.

An tributary module "LMX" (FIG. 5B) has external interfaces that support optical services, such as TDM (e.g. an OC48 or OTU1) or packet-based (e.g. 10 GigE). An incoming optical signal to tributary module "LMX" is converted into the electrical domain by optical transceivers in client processing circuitry 521, and one or more serial signals are provided to a framer 522. Framer 522 in one embodiment conforms to G.709 and adds an OTU-2 wrapper. The OTU-2 signal is then supplied to a tuneable optical transceiver 523 that converts this signal into the optical domain on a specific lambda. The specific lambda that is generated by transceiver 523 is provisionable by a network controller of the telecommunication network.

Next the lambda from transceiver 523 is received at a variable optical attenuator 524 adjusts the intensity to a value appropriate for a result of splitting by splitter 525 to be at the nominal value. Note that the optical signal supplied by splitter 525 to the optical fabric module contains only one lambda, and for this reason the signal is supplied to only those four slots in which four trunk modules "LXC" are respectively present in shelf 100.

In the egress direction, an optical switch 526 receives signals from each of the four trunk modules "LXC" and selects one of these four optical signals. The selected optical signal is then transmitted to a tunable optical filter 527 that selects one wavelength (e.g. from among 40 lambdas) and the selected lambda is then transmitted to a transceiver 523 which generates an electrical signal. The electrical signal may be a TDM signal or a packet switched signal, either of which is framed as per OTN. Hence, this electrical signal from transceiver 523 is supplied to framer 522 which strips off framing bits/bytes and supplies the signal to client side processing circuitry 521.

Client side processing circuitry 521 has a serializer-deserializer (not shown in FIG. 5B) and a laser (also not shown) to generate an optical signal presented at an external interface of shelf 100, e.g. as an OC48 signal or an OTU1 signal. Client side processing circuitry 521 includes switches (not shown in FIG. 5B) which can be provisioned remotely to send any electrical signal in circuitry 521 via path 528 to hybrid fabric module(s), for electrical switching and/or packet switching. Moreover, electrical signal(s) from hybrid fabric module(s) are received by switches in client side processing circuitry 521 and multiplexed with signals transmitted to framer 522 and/or optical signal generated and transmitted out of shelf 100.

In some embodiments, optical components of tributary module "LMX" (FIG. 5B) are built into a daughter card, which card can be used with other modules, such as the PMX module. Specifically, transceiver 523, attenuator 524, splitter 525, switch 526, and filter 572 are all built into a daughter card, while electrical components are built directly into the tributary module "LMX." In one illustrative embodiment, the LMX module occupies only one slot, and can map four 2.5 Gbps signals into an OTU2 payload. The LMX module includes on-board tunable optics, and provides colorless operation. In this embodiment, the LXC module occupies 2 slots, and supports multiplexing 40 lambdas. The LXC module has automated signal amplification and dispersion compensation built in.

In some embodiments of the invention, electrical-optical inter-fabric circuitry 115A (FIG. 3C) is implemented in an inter-fabric module "PMX" (FIG. 5C) that has interfaces to an optical fabric as well as to an electrical fabric. Electrical-optical module "PMX" has a daughter card similar or identical to that described above for module "LMX", which is coupled to the optical fabric module. The daughter card receives/transmits an OTN signal to/from an OTN mapper 532. OTN mapper 532 on module "PMX" (FIG. 5C) is also similar to the above-described framer 522 on module "LMX" (FIG. 5A). One distinction between these modules is that framer 522 is an OC-48/OC-192 OTU-2 framer, whereas mapper 532 is an Ethernet to OTU-2 mapper. Note that although modules "PMX" and "LMX" are similar in many respects relative to the optical fabric module, in the illustrative embodiment they send/receive different speed signals to/from the electrical fabric. Specifically, LMX supplies 2.5 Gbps TDM signal (OC48) while PMX supplies a 10 Gbps Ethernet signal.

Module "PMX" also has a multi-layer switch 531 that is coupled to OTN mapper 532 to receive/transmit an Ethernet signal embedded within the OTN signal. Multi-layer switch 531 implements an Ethernet switch locally to/from components within the PMX module, and also performs MAC-in-MAC encapsulation of Ethernet packets received by module "PMX" from an external interface via phy 530. After encapsulation, multi-layer switch 533 switches the packets along paths that have been provisioned. Multi-layer switch 531 also receives Ethernet packets in an electrical signal from the electrical fabric via an electrical switch 533. The packets from electrical switch 533 are already MAC-in-MAC encapsulated upstream, and hence the packets from switch 533 are directly switched through multi-layer switch 533 along provisioned paths. Note that multi-layer switch 533 of one embodiment implements the standard PBB while another embodiment implements the standard PBB-TE. Also, inter-fabric module "PMX" of one embodiment has optical transceivers in PHY layer circuitry 530 that are pluggably, i.e. removable so they can be replaced with electrical transceivers. Accordingly, module PMX has an 1 GbE optical interface in one embodiment and PMX has an 1 GbE electrical interface in another embodiment.

Figure 5C:
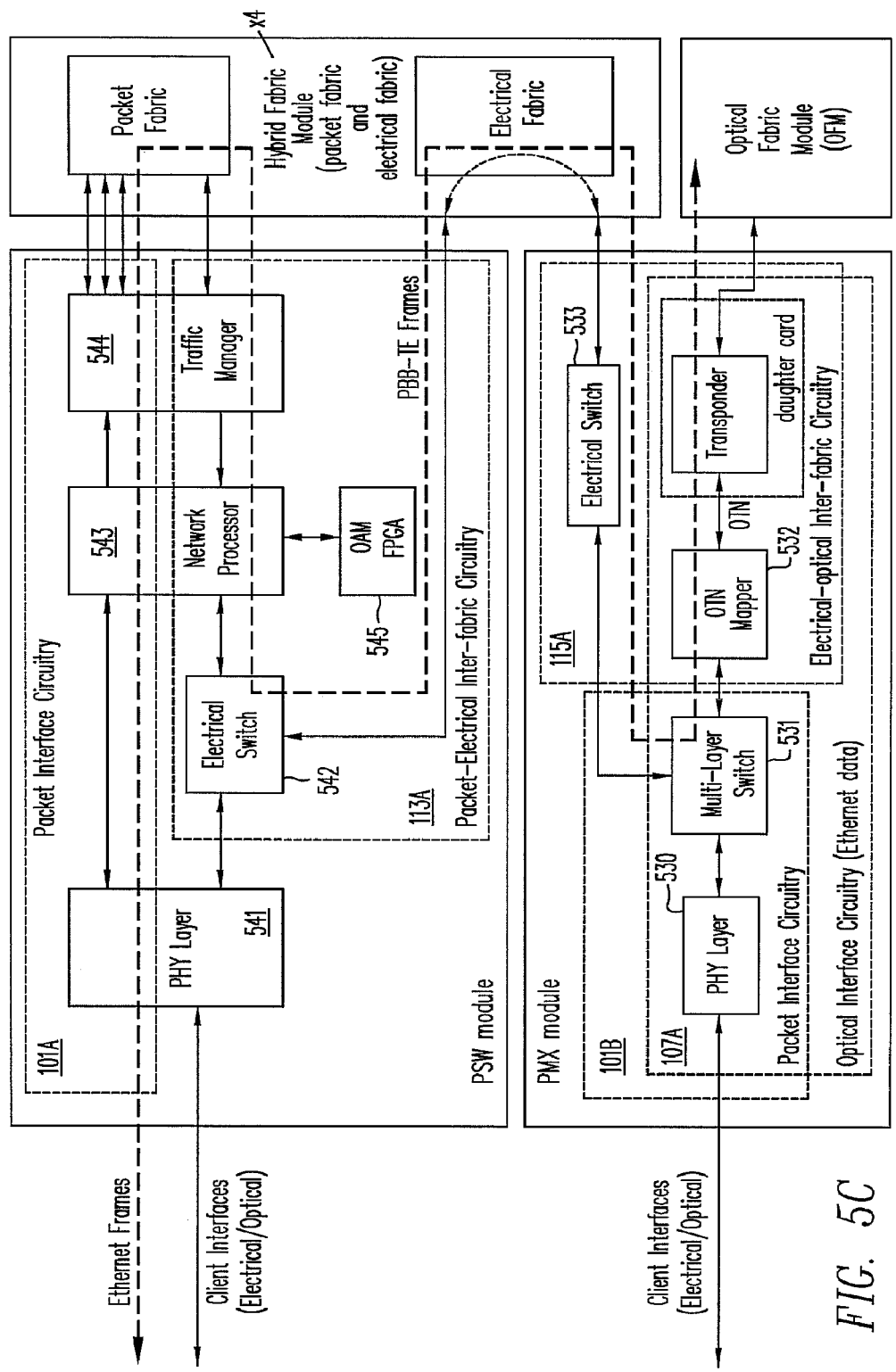
FIG. 5C illustrates two cards (called "PSW" and "PMX") that are coupled to packet and electrical fabrics in a shelf of some embodiments of the invention.
Figure 5D:
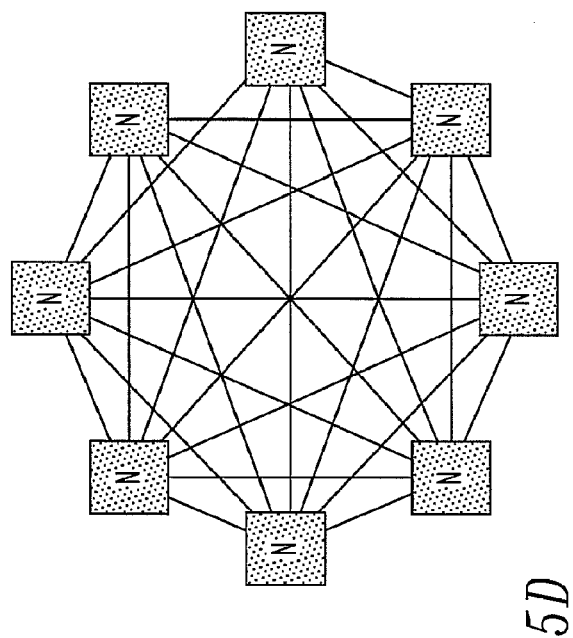
FIGS. 5D and 5E illustrate an electrical crossbar and an optical crossbar respectively that are used within a single shelf in combination with a packet fabric in accordance with the invention.
Figure 5F:
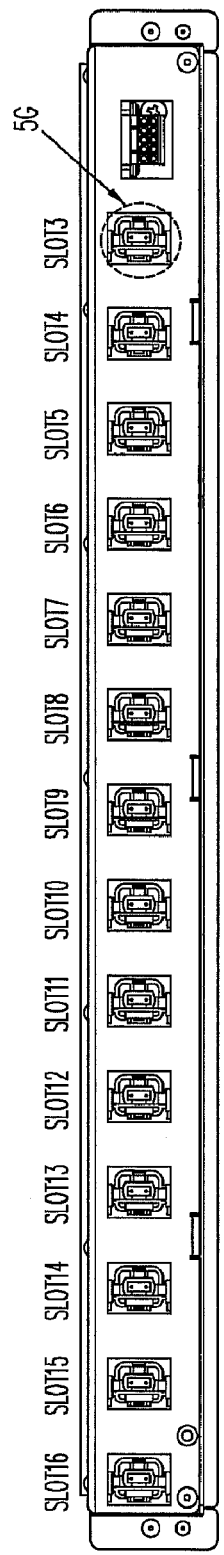
FIG. 5F illustrates a front view of an optical fabric module 215 used in some embodiments.
Figure 5E:
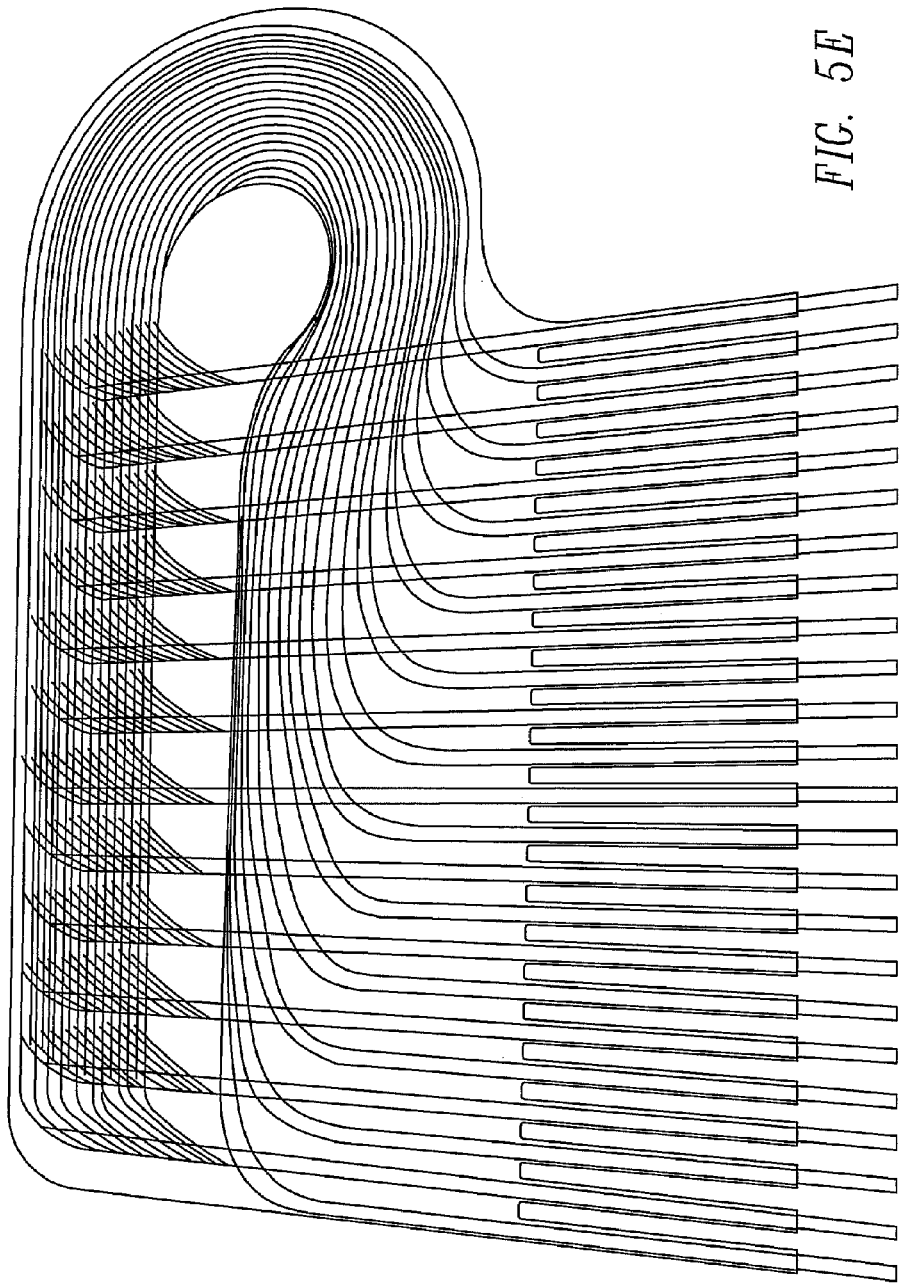
Figure 5G:
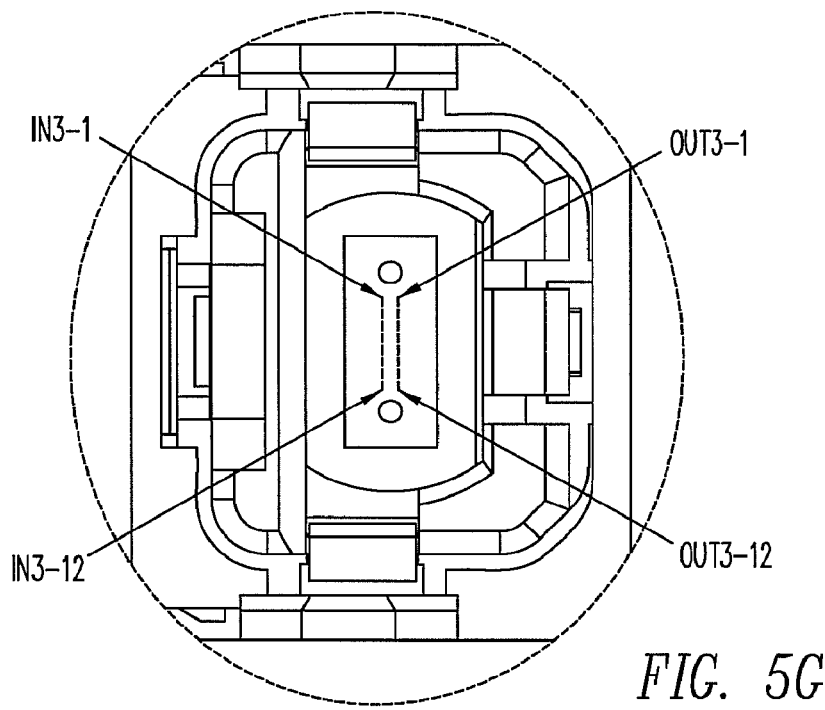
FIG. 5G illustrates detail of a single optical connector which is labeled 5G in FIG. 5F, with two vertical rows of fibers, including a left row for input signals labeled IN3-1, 1N3-12 and a right row for output signals labeled OUT3-1 and OUT3-12.
Figure 5H:
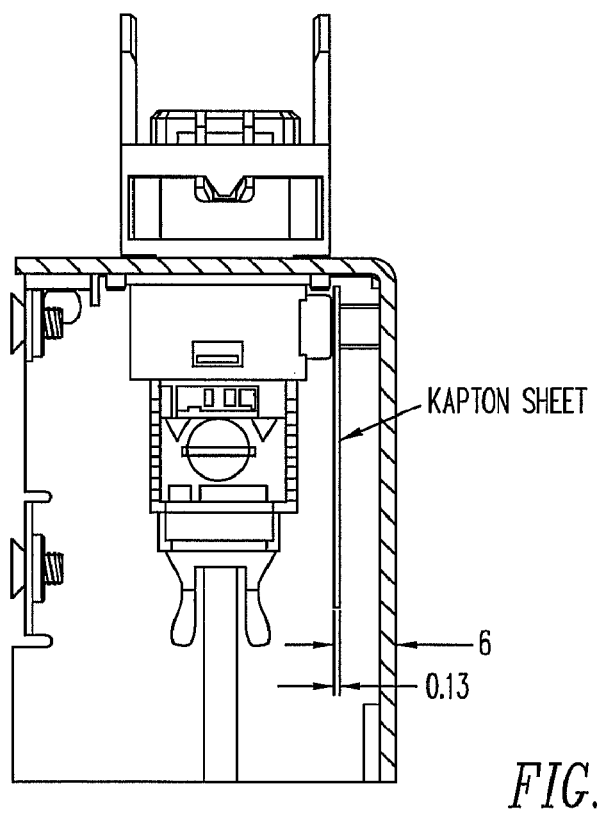
FIG. 5H illustrates a cross-sectional view along the direction Z-Z in FIG. 5I.
Figures 1, 5I:
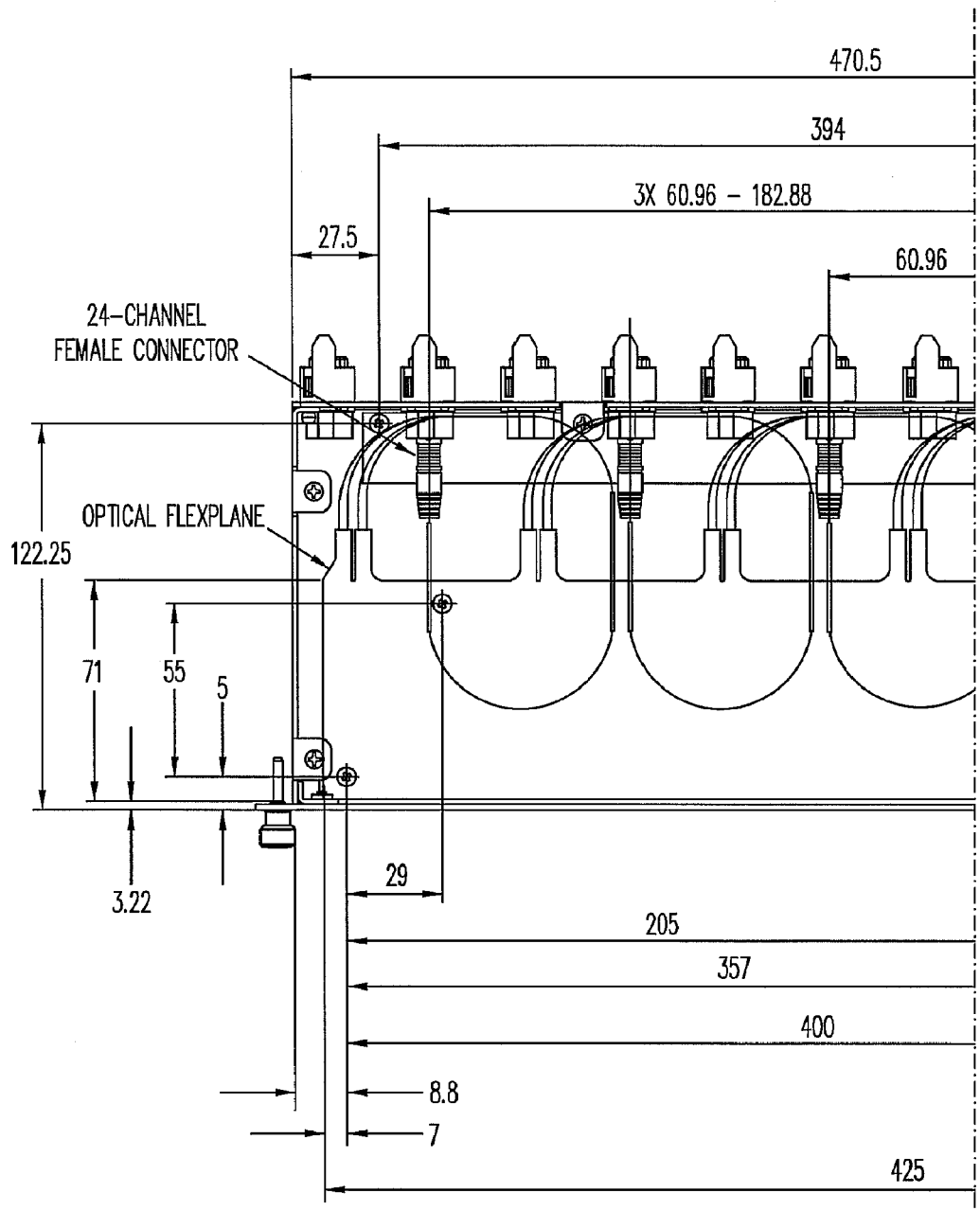
FIG. 5I (including FIGS. 5I-1 and 5I-2) illustrates a top view of the optical fabric module 215, with the lid removed, wherein optical fibers are illustratively shown connecting four connectors to a laminate which holds the fibers in an optical flexplane; in this view, dimensions are shown in millimeters.
Figures 2, 5I:
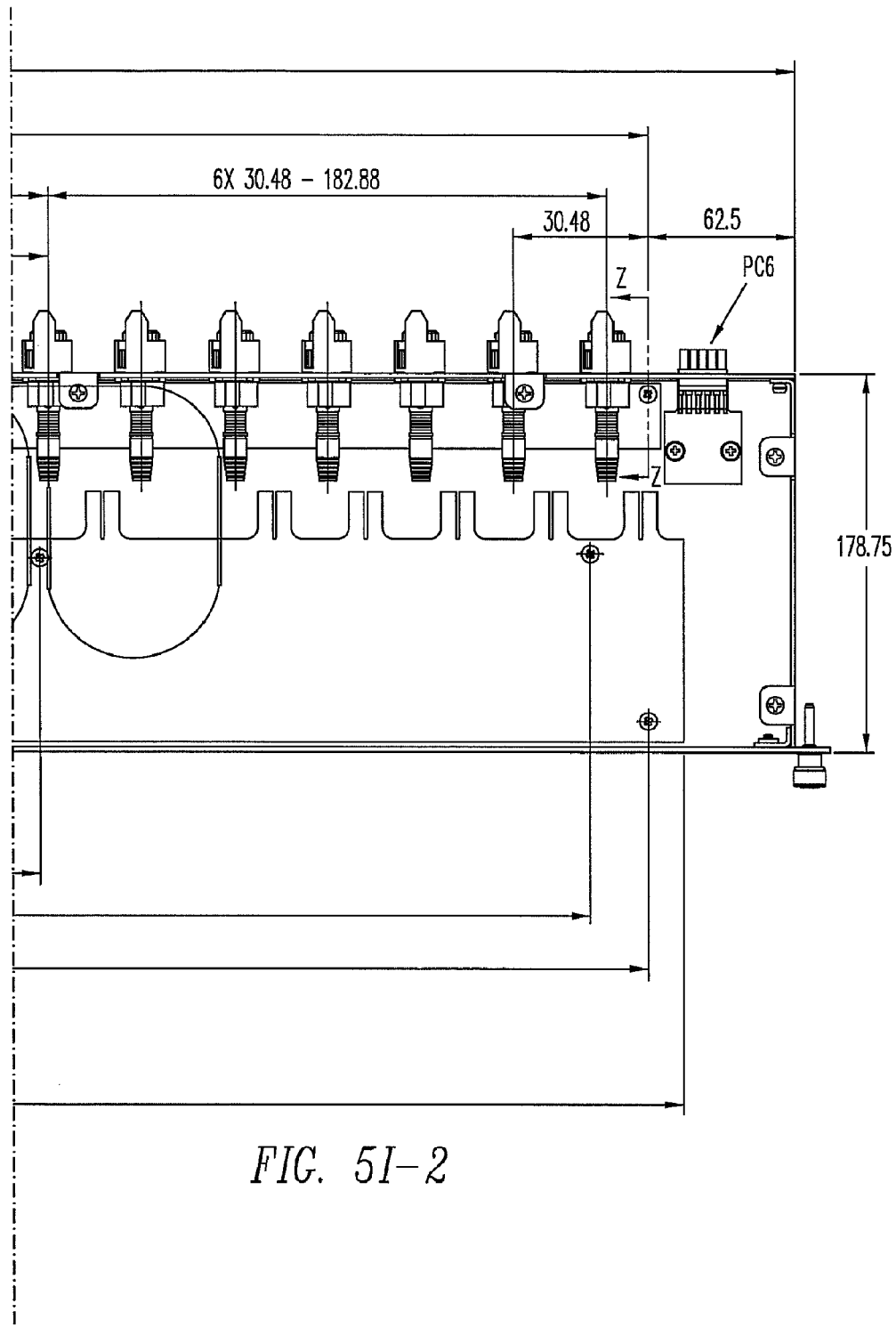

FIG. 5C illustrates another rmodule "PSW" that contains packet-electrical inter-fabric circuitry 113A (FIG. 3C) and has interfaces to a packet fabric as well as to an electrical fabric. Module PSW includes PHY layer circuitry 541 that includes optical transceivers, such as XFP modules which form external interface(s) of the shelf, to transmit/receive optical signals, such as two 10 GbE signals. The optical signals are converted into XAUI signals that are transmitted to a network processor 543 either directly or through an electrical switch 543. Note that PHY layer circuitry 541 also has pluggable transceivers which are removable so that module PSW has an 1 GbE optical interface in one embodiment and PSW has an 1 GbE electrical interface in another embodiment. Network processor 543 classifies packets into flows based on their Ethernet headers. The flows are supplied by network processor 543 to a traffic manager 544 which performs shaping, aggregation and grooming of traffic into one or more tunnels.

Traffic manager 544 uses 3 Gbps serial links to transfer the traffic to a packet fabric that in turn switches the traffic to one of its other serial links. This traffic then is received by another traffic manager 544 in another PSW module (although for convenience of illustration, the same PSW module is shown in FIG. 5C). The traffic then passes through traffic manager 544 that performs Mac-in-Mac encapsulation and provides the traffic (via network processor 543) to electrical switch 542 for uploading to the transport network. Note that a combination of multiple traffic managers and the packet fabric together implement an Ethernet switch that can switch packets globally to/from modules in shelf 100 (if the modules have a traffic manager). Electrical switch 542 switches the electrical signal (stream of PBB-TE frames) to the electrical fabric, which in turn transfers the signal to an electrical switch 533 in the module "PMX." Module "PMX" eventually transfers the packet stream to the optical fabric module as described above.

In some embodiments, in addition to Mac-in-Mac encapsulation that is performed in PSW and PMX modules (by network processor 543 and multi-layer switch 531 respectively), a field programmable gate array 545 is used in module PSW to create continuity check messages (CCM) for use in management of faults in connectivity.

One illustrative embodiment uses the "CFM" standard to send CCMs periodically to determine if a particular link is active. CCMs are used in this embodiment to implement carrier-class recovery from faults. Switchover within 50 ms is achieved by sending CCMs at 3.3 ms intervals, with missing CCMs for 10 ms triggering alarm indication signal (AIS) and Remote Defect Indication (RDI) for fault notification, followed by switchover which must be completed in 40 ms. An FPGA creates CCMs in hardware, faster and more predictably than can be done by the network processor. The FPGA also detects CCMs and triggers a state machine within the network processor when a failure is detected (e.g. 3 missing CCMs).

One embodiment uses 1:1 path protection with traffic being sent only on the working side or on the protect side, never both at the same time. This embodiment supports bidirectional switching only, wherein bridge selectors for each direction of the protected path track each other at all time. For each path or segment it creates, the network controller sets up continuity checks for both directions. In the transport network, a segment CCM represents a B-VID. CCMs are monitored at each end of the segment, and if CCM messages are missing for 3.5 intervals or more, the node automatically switches to the protect path. At the same time, the node begins to transmit RDI indication by setting the RDI bit in CCM messages travelling in the opposite direction. Upon receiving RDI, the remote node also switches to the protect path and service is restored. As noted above, in addition to RDI, a shelf in some embodiments also generates the AIS to higher layer CCM's whenever applicable. AIS can be triggered by two primary conditions: LOS at the link layer and continuity check failures at segment and end-to-end layers. This function is handled by the network processor in these embodiments.

Each of the modules illustrated in FIGS. 5A-5C has a host processor (not shown) that runs management software to communicate with other modules in the shelf. Moreover the module PSW also has an FPGA that is coupled to the traffic manager to receive and maintain statistics, e.g. on the number of packets being dropped per queue etc. Module PSW also has a timing core to ensure 10 Gbps interfaces in module PSW remain in synchronization with system timing in shelf 100.

In one example, traffic manager 544 in the module PSW is implemented by FAV21 V available from Dune Networks. In this example, network processor is implemented by X11-d240 available from Xelerated Inc. Electrical switch 542 is implemented by XAUI switches. Traffic manager 544 is connected to the packet fabrics using a total of 24 full-duplex serial links at 3.125 Gbps in groups of 6, with one group being connected to each packet fabric. In addition, electrical switch 542 in module PSW is connected to the electrical fabrics using a total of 16 full-duplex serial links at 3.125 Gbps in groups of 4, with one group being connected to each electrical fabric. Moreover, in this example, multi-layer switch 531 is implemented by BCM56514 available from Broadcom Corporation. OTN framer 532 of this example is implemented by PEMAQUID available from AMCC. Electrical switch 533 is implemented by two M21453 (one each for egress and ingress) available from Mindspeed Technologies, Inc. which implements a 12×12 fully non-blocking electrical crossbar. G.709 Framer (or OTN Mapper) 522 of this example is implemented by the Cortina Tenabo.

In the example, packet fabric 102 is implemented by two switch fabrics FE200 available from Dune Networks. Also in the example, electrical fabric 104 is implemented by VSC3172 available from Vitesse Semiconductor Corporation. This chip is a 72×72 fully non-blocking electrical crossbar, and only 70 links are used at 10 Gbps speed, with 5 links per slot (as there are 14 slots in the front of the chassis of shelf 100, to hold interface modules and inter-fabric modules). Of the 5 links, 4 links may be used to switch XAUI signals from/to the PMX module or PSW module. In each slot, the fifth link from the crossbar in an illustrative embodiment is directly connected to an external 10 Gbps Ethernet optical interface on each of the PMX module and PSW module, whichever is present in the slot.

In one example, the following parts are used to implement the LMX and LSW illustrated in FIGS. 5A and 5B, WSS: Optium DWP100, Preamp EDFA: Avanex PureGain 2600, Booster EDFA: Avanex PureGain 1500, Optical Channel Monitor: Aegis CTM-4050, Variable Optical Attenuator: JDSU MATT VOA, Tunable Filter: JDSU VCF100, Transceiver: Optium 300-pin 10G NRZ Transponder. Any devices not explicitly described herein are commodity items available from several vendors.

Figure 6A:
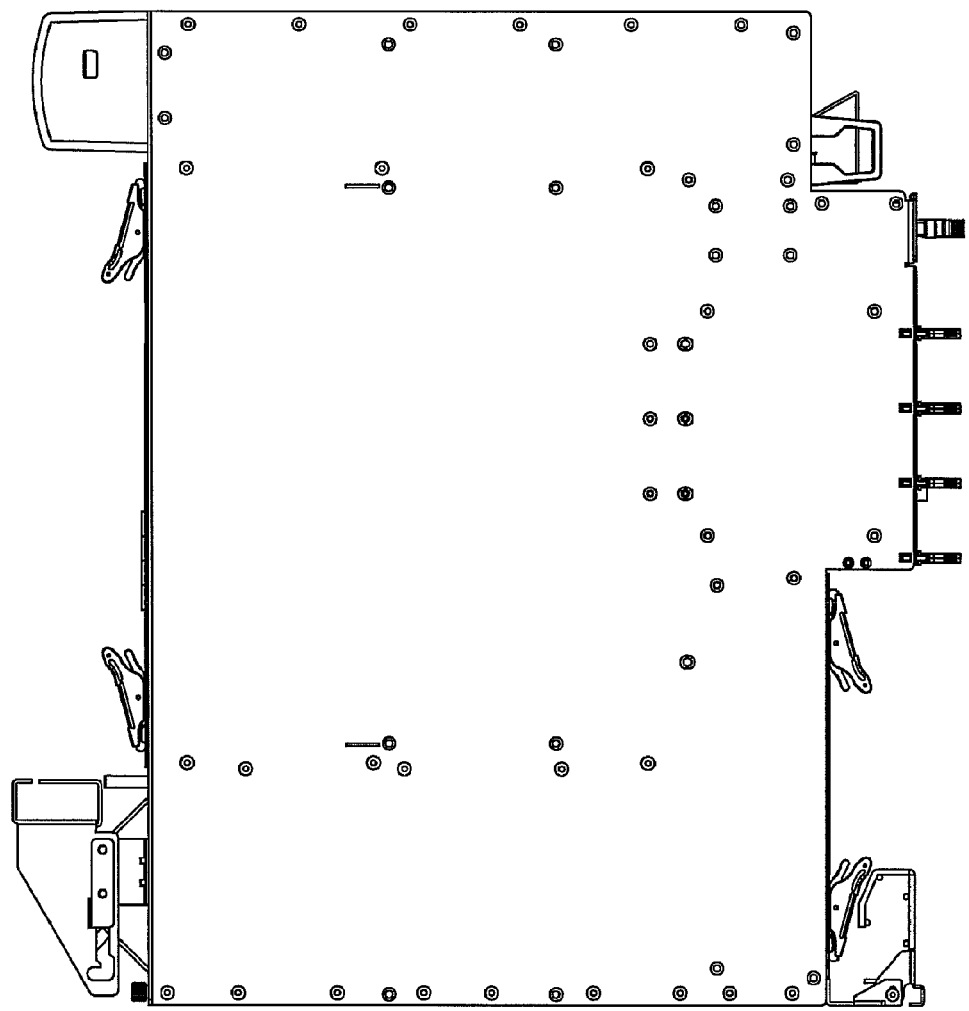
FIGS. 6A and 6B illustrate a side view and a rear view respectively, of the shelf of FIG. 3E.
Figure 6B:
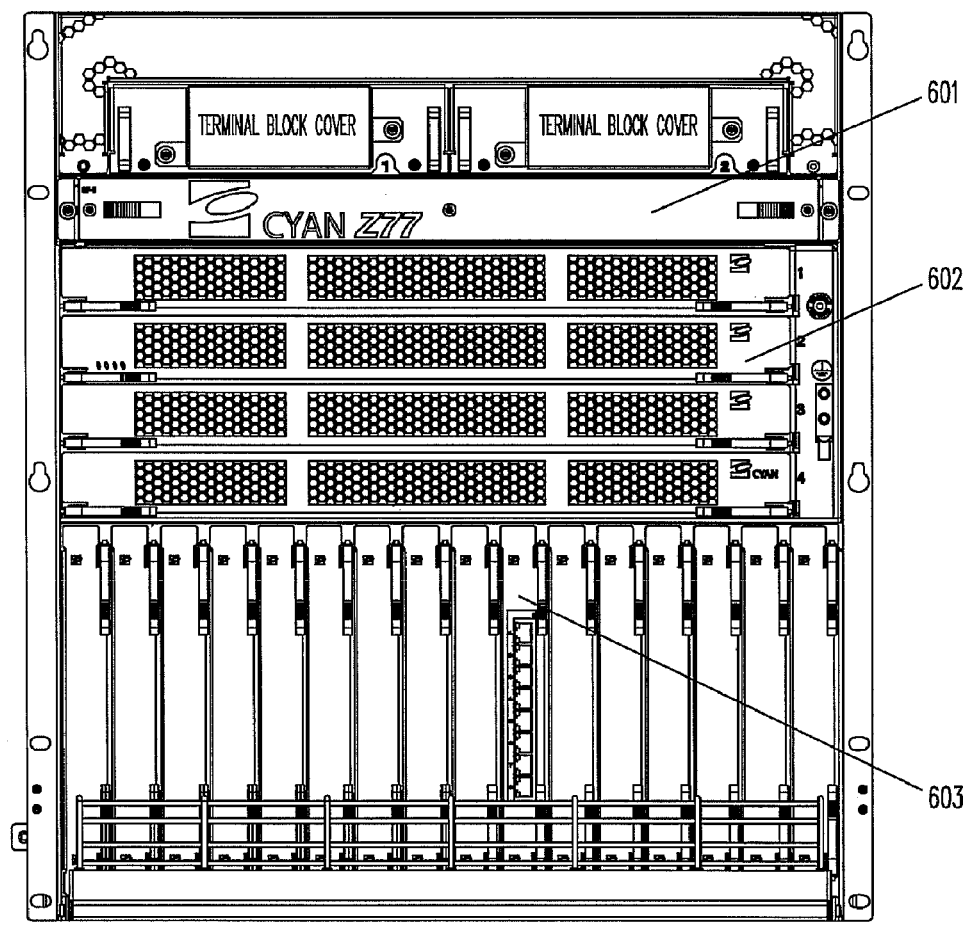

In the illustrative embodiment, a shelf 100 is illustrated in FIG. 6A which shows a side view in the direction "B-B" shown by arrows in FIG. 3E. FIG. 6B shows a rear view of shelf 100, with one horizontally-mounted optical fabric module 601 and four horizontally-mounted hybrid modules 602. A number of rear terminal modules 603 are mounted vertically, and these modules are typically connected to corresponding modules in the front region of shelf 100. For example, the module PMX has a multi-layer switch 531 which can be provisioned to drive copper interfaces (e.g. 1 GbE) in rear terminal modules 603.

Figure 6C:
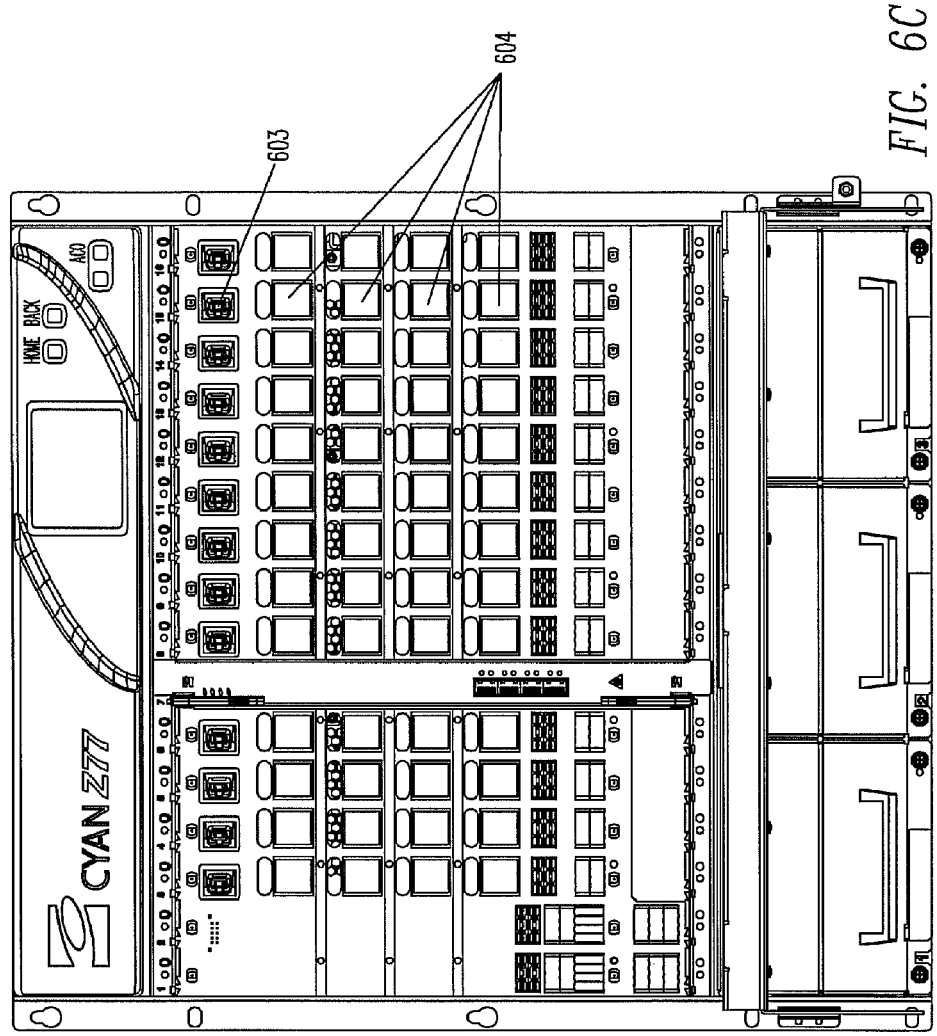
FIGS. 6C and 6D illustrate a front view and a perspective of a front region of the shelf of FIGS. 6A-6B, the front region being used to hold external interfaces and inter-fabric circuitry.
Figure 6D:
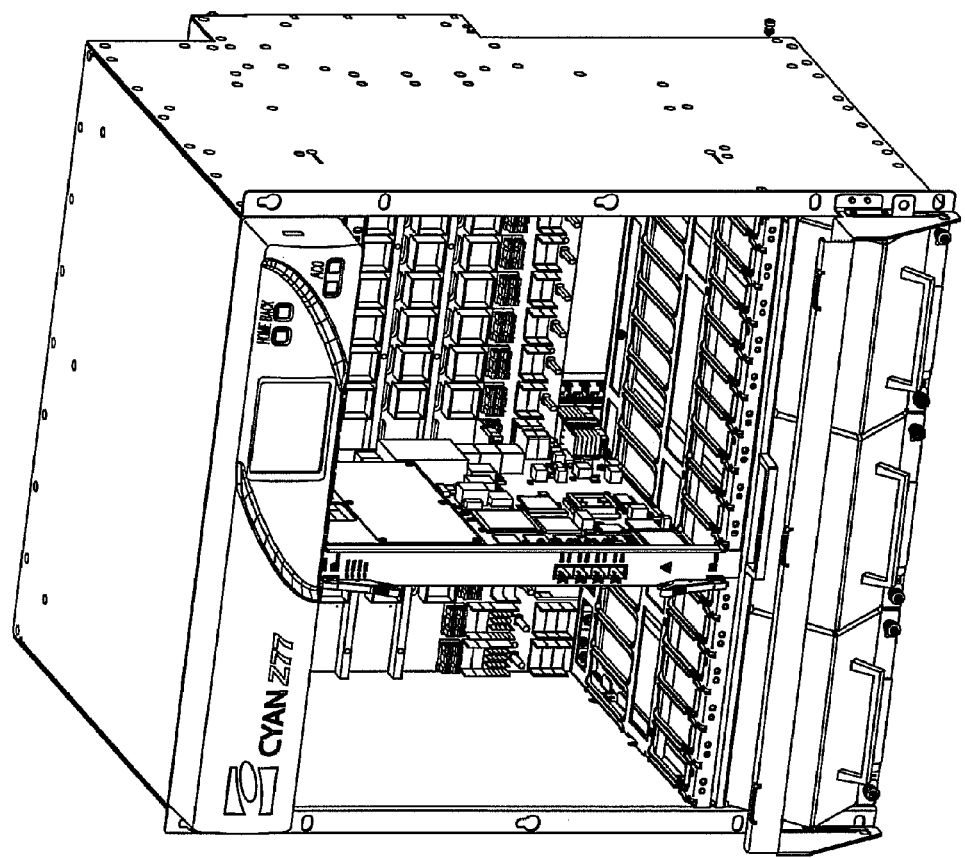
Figure 6E:
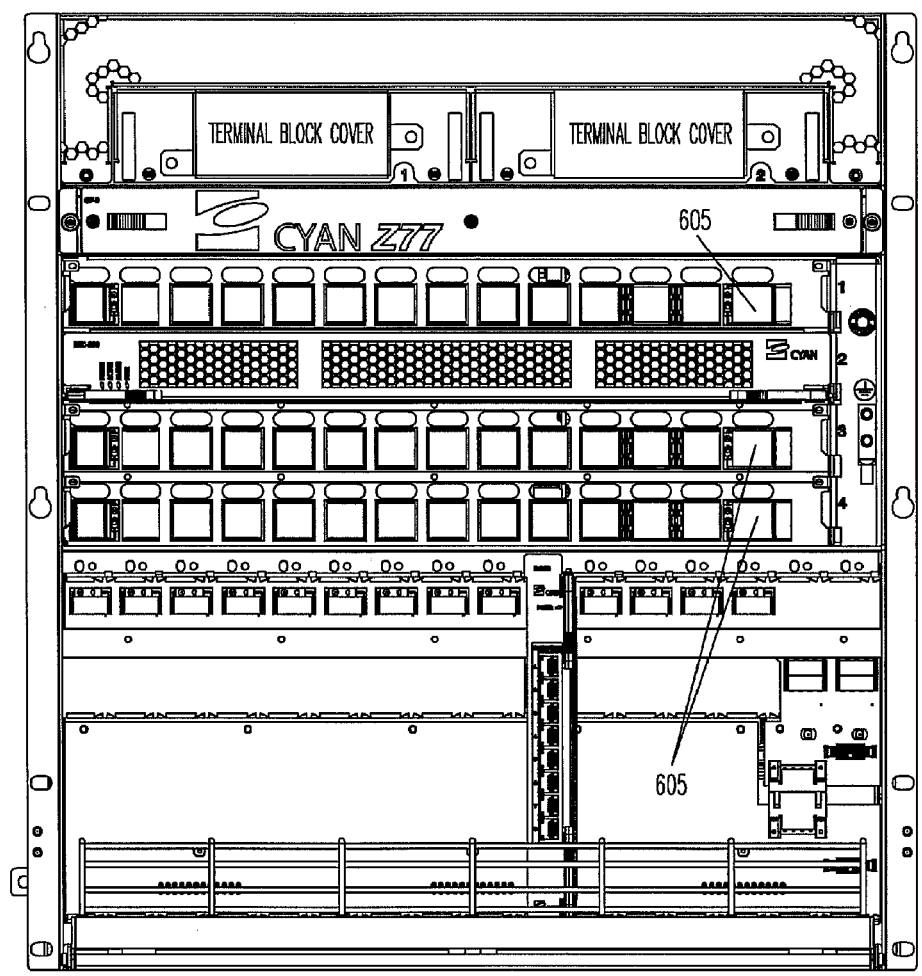
FIGS. 6E and 6F illustrate a rear view and a perspective of a rear region of the shelf of FIGS. 6A-6B, the rear region being used to hold fabrics and copper interfaces.
Figure 6F:
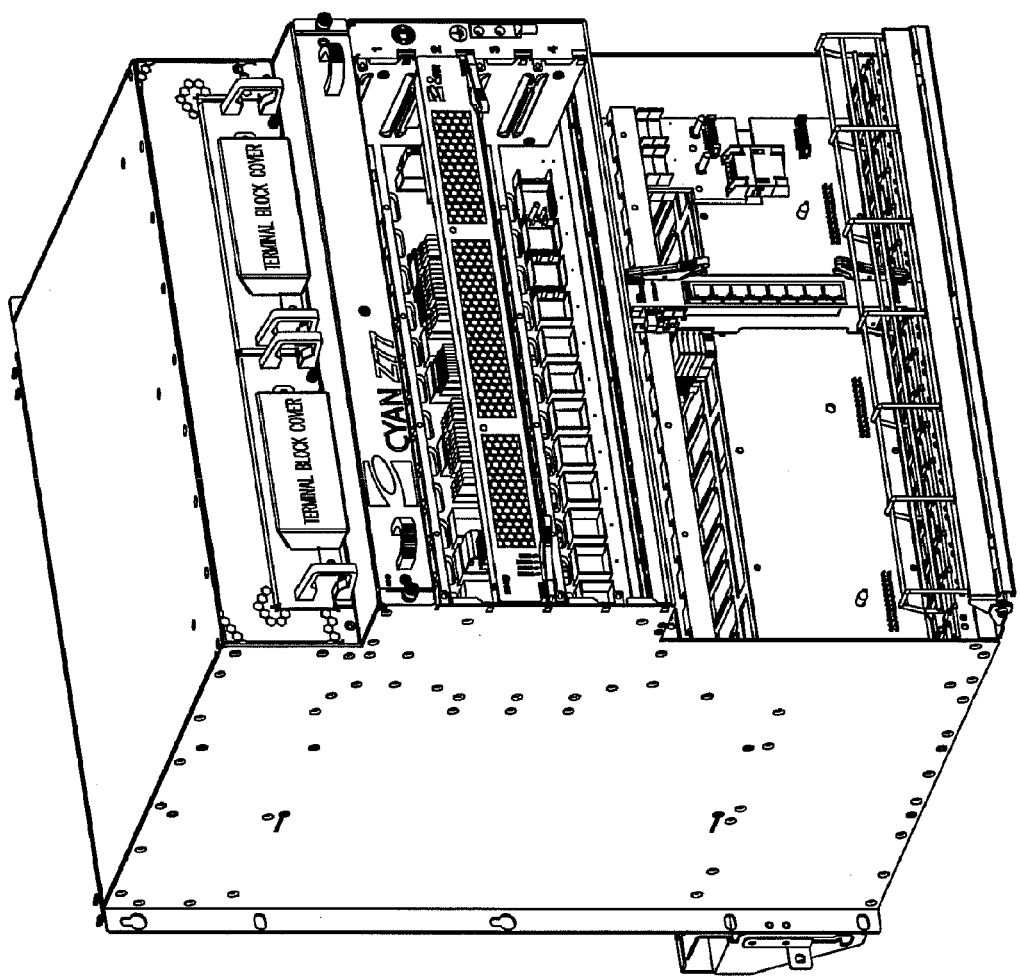
Figure 6G:
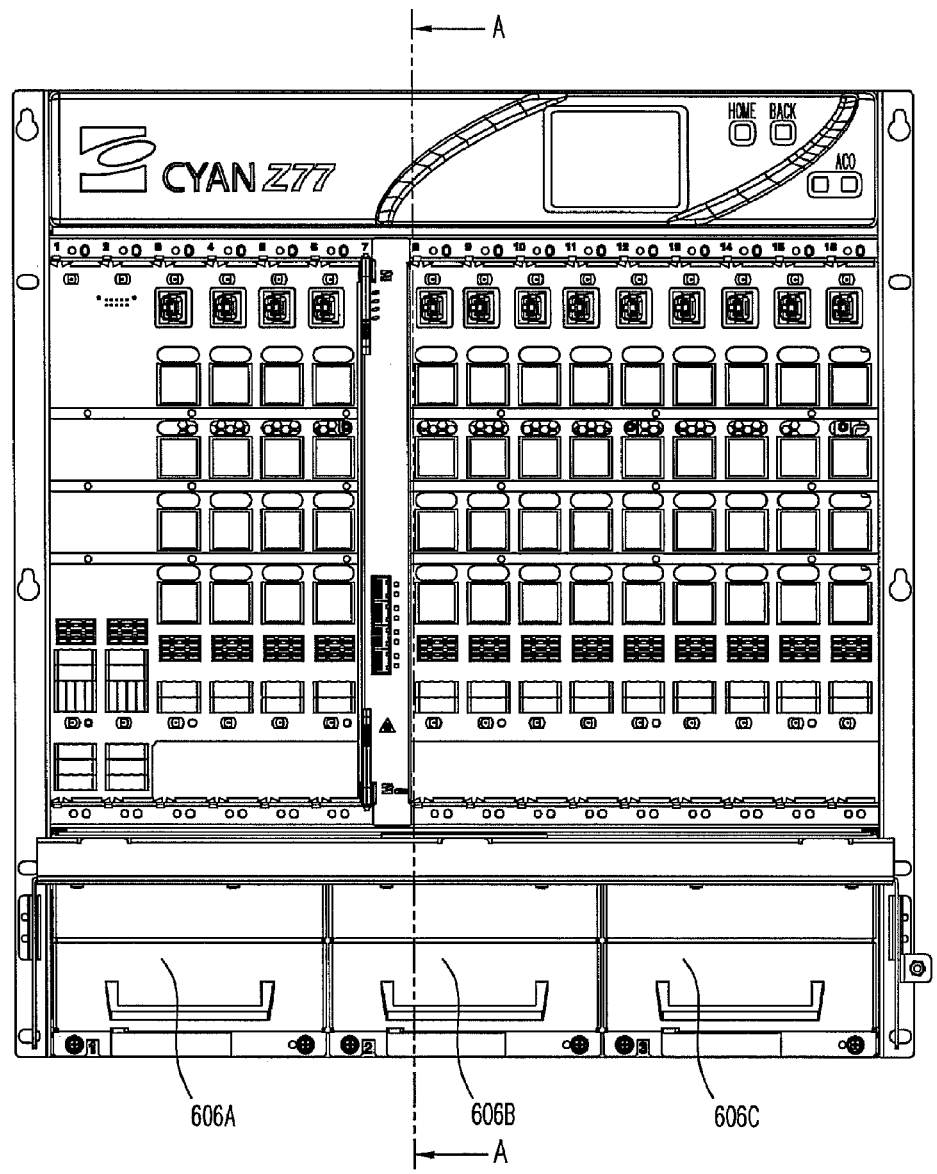
FIG. 6G is same as FIG. 6C with the addition of a section line A-A along which is shown a cross-sectional view in FIG. 6H.
Figure 6H:
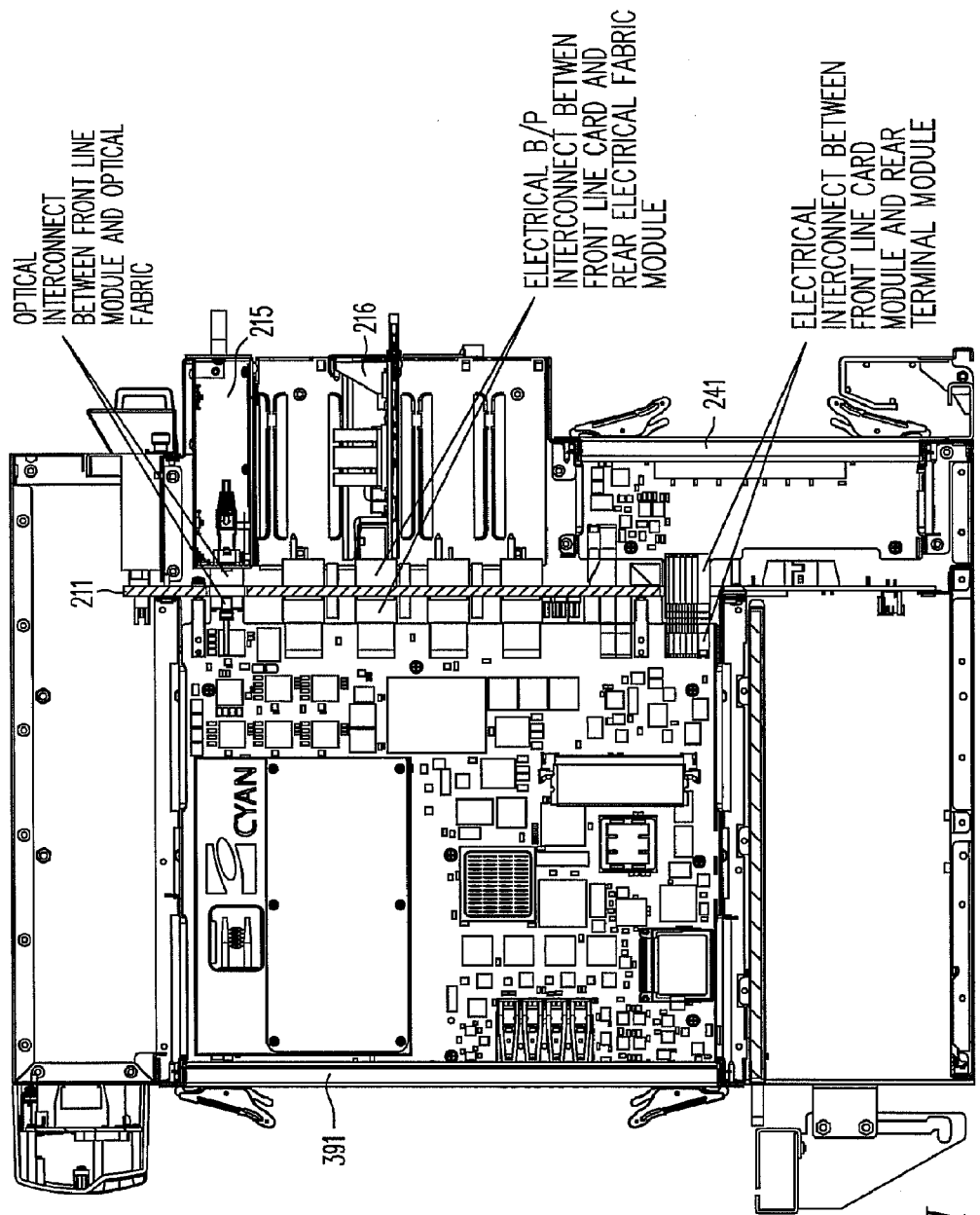
FIG. 6H is a cross-sectional view along section line A-A of FIG. 6G.
Figure 61:
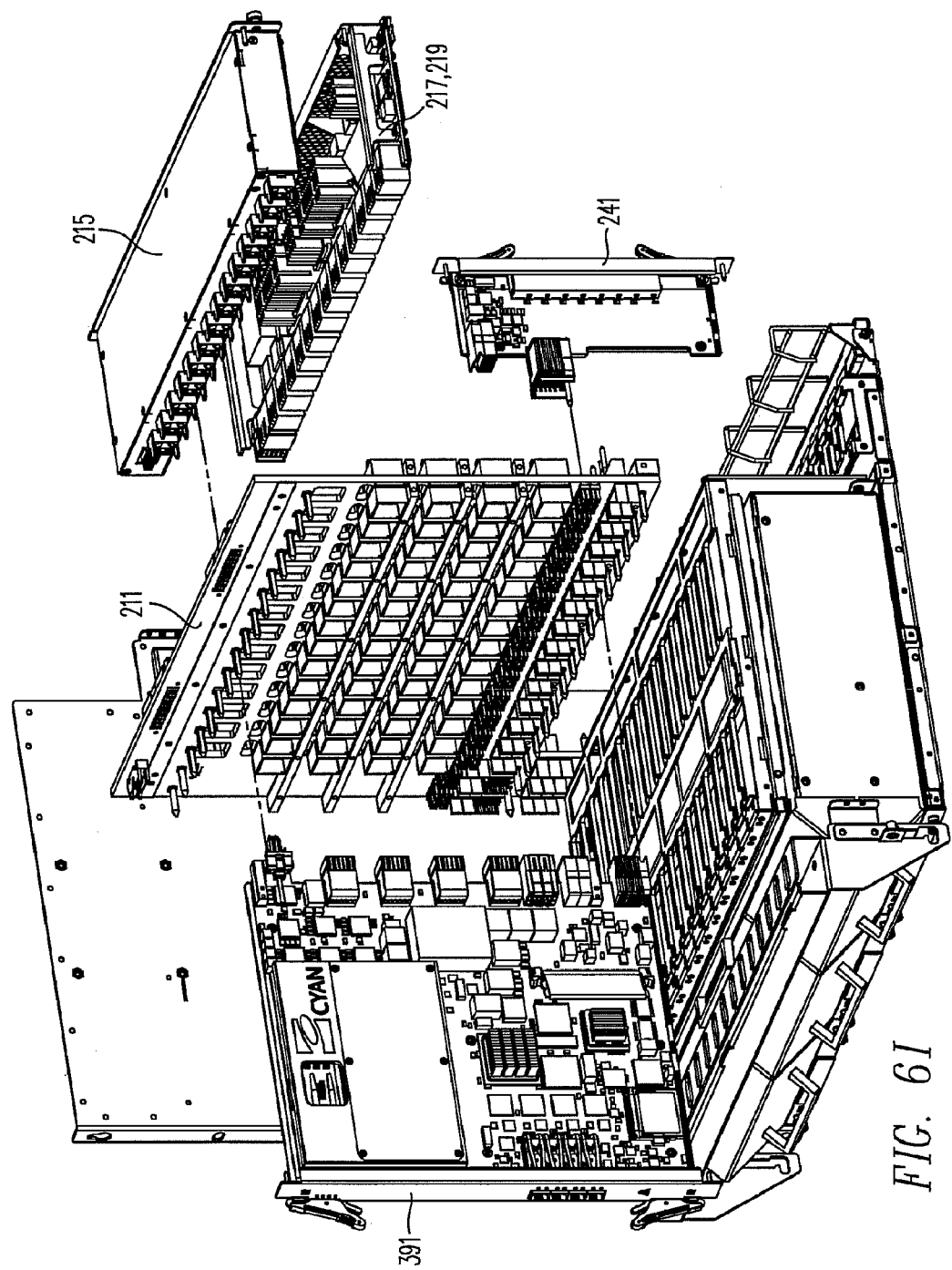

FIGS. 6C and 6D illustrate a front view and a perspective of a front region of shelf 100. As shown in FIG. 6C, the midplane in shelf 100 has a row 603 of optical connectors and four rows of electrical connectors 604. In FIGS. 6C and 6D, one module LMX is shown installed. FIGS. 6E and 6F illustrate a rear view and a perspective of a rear region of the shelf, with three rows 605 of electrical connectors visible, one hybrid module and the optical fabric module installed. FIG. 6G is same as FIG. 6C with the addition of section line A-A along which is shown a cross-sectional view in FIG. 6H. FIG. 6G also shows the three fan trays 606A-606C located at the bottom of the shelf, providing air flow from the front bottom to the back top of the shelf. The fans in trays 606A-606C operate under software control, and the fans speed up in the event of a failure. Note that three such shelves can be stacked in a 7' rack, with room left in the rack for fuse and alarm panel and AC outlet assembly. FIG. 6I is an exploded view of the shelf of FIGS. 6A-6G, wherein top and side portions of the shelf are removed to improve clarity.

In summary, the benefits of a single shelf 100 uses optical, electrical and packet fabrics all three types in a single chassis as shown in FIGS. 6A-6I are several. The shelf supports DWDM trunk interfaces which can scale from one to seven by simply adding additional LXC modules to the chassis. Wavelengths from any trunk can be switched to any other trunk across the optical backplane. Client signals can be added to the DWDM trunks through the use of various transponder modules LMX. The transponder modules LMX are accommodated in the same shelf as trunk modules LXC (up to degree-4). In addition to the optical functions, the shelf supports a flexible data plane in the same chassis. Four hybrid modules can be installed into the same shelf in the rear, to support high bandwidth applications with 3+1 protection. Alternatively, fabric modules for multiple types of data (Packet, TDM) can be installed with 1:1 protection in the rear. In the absence of an active fabric element, the slots can be used to implement a passive interconnect.

One example of shelf 100 is implemented in based on the following industry standards, each of which is attached hereto, and is incorporated by reference herein in its entirety: ITU-T Recommendation G.709/Y.1331—Interfaces for the Optical Transport Network (OTN), March 2003; ITU-T Recommendation G.975—Forward Error Correction for Submarine Systems, October 2000; ITU-T Recommendation G.975.1—Forward Error Correction for high bit-rate DWDM submarine systems, February 2004; IEEE 802.1 ah/D4.0—DRAFT Amendment to IEEE Std 802.Q—REV, Virtual Bridged Local Area Networks—Amendment 6: Provider Backbone Bridges, Nov. 21, 2007; and IEEE 802.1 Qay/D2.0—DRAFT Amendment to IEEE Std 802.Q—2005, Virtual Bridged Local Area Networks—Amendment: Provider Backbone Bridge Traffic Engineering, Feb. 15, 2008. Implementation of such industry standards in a single shelf that uses optical, electrical and packet fabrics all three types in a single chassis is believed to be nowhere disclosed or rendered obvious in any prior art known to the inventor(s).

Numerous modifications and adaptations of the embodiments described herein will become apparent to the skilled artisan in view of this disclosure. For example, some embodiments support various legacy services such as Frame Relay and ATM by using Pseudowire ("PW") directly over PBB-TE. Also, although some embodiments use PBB-TE over G.709 over DWDM, other embodiments use Transport MPLS ("TMPLS") over G.709 over DWDM. Moreover, although G.709 is used to frame the signal, any other wrapper may be used in other embodiments. Also, the term "packet", as used in the description above of many illustrative embodiments, refers to units of data having MAC header(s), for example, an IP packet when encapsulated in an Ethernet frame. However, depending on the embodiment, units of data with other types of headers may also be switched in a connection oriented manner as described herein by a packet switch, e.g. some embodiments of packet switches used in a shelf 100 switch data units of fixed size using virtual circuits, similar to ATM but with larger size, such as 1500 bytes for a MAC frame conforming to Ethernet. Numerous modifications and adaptations of the embodiments described herein are encompassed by the scope of the invention.

What is claimed is:

1. A method of processing traffic in a transport network, the method comprising:
   a network element receiving from a trunk interface, a first stream of traffic, said the first stream of traffic comprising a plurality of lambdas;
   said network element using an optical fabric to perform optical switching on the first stream to replace a first lambda in the plurality of lambdas with a second lambda;
   said network element converting, in a single shelf, the first lambda into an electrical signal;
   said network element using an electrical fabric housed within the single shelf to perform electrical switching on the electrical signal;
   wherein the electrical signal received by the electrical fabric is amplified at predetermined frequencies and re-shaped;
   said network element recovering, in the single shelf, a plurality of first frames in the electrical signal;
   said network element using a packet fabric housed within the single shelf to perform packet switching on the plurality of first frames to generate a flow of second frames; and
   said network element transmitting at a client interface, the flow of second frames.

2. The method of claim 1 wherein:
   data in the electrical signal comprises a plurality of framing bits in conformance with a predetermined forward error correction code; and
   the electrical switching is performed without using the predetermined forward error correction code.

3. The method of claim 1 wherein the flow is hereinafter a second flow, and wherein:
   a first frame, in the plurality of frames being recovered from the electrical signal converted from the first lambda, has a first media access control header, the first media access control header encapsulating a second media access control header; and
   a second frame, in the second flow being transmitted at the client interface, has the second media access control header.

4. The method of claim 1 wherein the flow is hereinafter a second flow, and wherein:
   a first flow that comprises the plurality of first frames follows a specific path through the transport network;
   the specific path is identified in at least one intermediate node in the transport network, based on a VLAN identifier and a destination address in a first media access control header encapsulating a second media access control header;
   a first frame in the first flow has the first media access control header encapsulating the second media access control header; and
   a second frame in the second flow has the second media access control header.

5. The method of claim 1 wherein the flow is hereinafter a second flow, and wherein:
   a specific path through the transport network, of a first flow that comprises the plurality of first frames, is provisioned in at least one intermediate node in the transport network; and
   the at least one intermediate node performs switching on the first flow without recovery of individual packets in another single shelf.

6. The method of claim 5 wherein:
   the specific path is set up remotely by a network controller of a carrier that operates the transport network.

7. The method of claim 1 wherein the flow is hereinafter a second flow, and wherein:
   a first flow that comprises the plurality of first frames follows a specific path through the transport network.

8. The method of claim 7 wherein:
   in at least one intermediate node in the transport network, the specific path is provisioned.

9. The method of claim 8 wherein:
   the specific path is set up by a network controller in response to a connection request.

10. The method of claim 9 wherein:
    the single shelf is provisioned remotely by the network controller.

11. The method of claim 7 wherein:
    the specific path is identified in at least one intermediate node in the transport network, based on at least one field in a first media access control header encapsulating a second media access control header;
    a first frame in the first flow has the first media access control header encapsulating the second media access control header; and
    a second frame in the second flow has the second media access control header.

12. A method of processing traffic in a transport network, the method comprising:
    a network element receiving from a trunk interface, a first stream of traffic, said the first stream of traffic comprising a plurality of lambdas;
    said network element using an optical fabric to perform optical switching on the first stream to replace a first lambda in said plurality of lambdas with a second lambda;
    said network element converting, in the single shelf, said the first lambda into an electrical signal;
    wherein the electrical signal is amplified at predetermined frequencies and re-shaped;
    said network element recovering, in the single shelf, a plurality of first frames in the electrical signal;
    said network element using a packet fabric housed within the single shelf to perform packet switching on said the plurality of first frames to generate a flow of second frames; and
    said network element transmitting at a client interface, said the flow of second frames.

13. The method of claim 12 wherein:
    data in the electrical signal comprises a plurality of framing bits in conformance with a predetermined Reed-Solomon code;
    each a second frame in said flow has a first second media access control header; and each a first frame in the plurality of frames has a second first media access control header, said second media access control header encapsulating said first the second media access control header.

14. The method of claim 12 wherein the flow is hereinafter a second flow, and wherein:
a first frame in the plurality of frames has a first media access control header, the first media access control header encapsulating a second media access control header; and
a second frame in the second flow has the second media access control header.

15. The method of claim 12 wherein the flow is hereinafter a second flow, and wherein:
a first flow that comprises the plurality of first frames follows a specific path through the transport network;
the specific path is identified in at least one intermediate node in the transport network, based on a VLAN identifier and a destination address in a first media access control header encapsulating a second media access control header;
a first frame in the first flow has the first media access control header encapsulating the second media access control header; and
a second frame in the second flow has the second media access control header.

16. The method of claim 12 wherein:
a specific path through the transport network, of a first flow that comprises the plurality of first frames, is provisioned in at least one intermediate node in the transport network.

17. The method of claim 16 wherein:
the specific path is set up by a network controller of a carrier that operates the transport network.

18. The method of claim 12 wherein the flow is hereinafter a second flow, and wherein:
a first flow that comprises the plurality of first frames follows a specific path through the transport network.

19. The method of claim 18 wherein:
in at least one intermediate node in the transport network, the specific path is provisioned.

20. The method of claim 19 wherein:
the specific path is set up by a network controller in response to a connection request.

* * * * *